United States Patent [19]

Toyoda et al.

[11] Patent Number: 5,732,301
[45] Date of Patent: Mar. 24, 1998

[54] CAMERA HAVING VARIABLE-SIZED IMAGE PLANE AND IMAGE PLANE SIZE INDICATOR

[75] Inventors: Yasuhiro Toyoda; Ryoji Okuno, both of Kanagawa-ken, Japan

[73] Assignee: Canon Kabushiki Kaisha, Tokyo, Japan

[21] Appl. No.: 341,840

[22] Filed: Nov. 18, 1994

Related U.S. Application Data

[63] Continuation of Ser. No. 46,075, Apr. 12, 1993, abandoned.

[30] Foreign Application Priority Data

| Apr. 20, 1992 | [JP] | Japan | 4-125374 |
| Apr. 24, 1992 | [JP] | Japan | 4-106855 |
| Jun. 24, 1992 | [JP] | Japan | 4-166210 |

[51] Int. Cl.$^6$ .................................................. G03B 17/00
[52] U.S. Cl. .............................................. 396/436; 396/543
[58] Field of Search ........................ 354/94, 159, 465, 354/486; 396/281, 287, 373, 380, 435, 436, 543

[56] References Cited

U.S. PATENT DOCUMENTS

| 5,066,971 | 11/1991 | Kodaira | 354/465 |
| 5,086,311 | 2/1992 | Naka et al. | 354/94 X |
| 5,353,077 | 10/1994 | Tanaka et al. | 354/94 |

*Primary Examiner*—Safet Metjahic
*Assistant Examiner*—J. K. Han
*Attorney, Agent, or Firm*—Robin, Blecker and Daley

[57] ABSTRACT

A camera is capable of forming different photographic image plane frames by causing a light blocking member which is movable in at least a photographic optical path to block part of a photographic light flux. The camera is provided with an urging member for imparting an urging force to the light blocking member, the direction of the urging force being changed when the light block member is located at a particular position in its movement course, a switching member arranged to switch its state at a point in a process in which the light blocking member moves from its maximum retracted position where the smallest amount of light flux is blocked to the particular position, and a display member for visually displaying the state of movement of the light blocking member, i.e., which of the photographic image plane frames has been formed, in accordance with the state of the switching member. In the above arrangement, during a photographic image plane frame switching operation, even if the light blocking member stops at or near the particular position and an imperfect photographic image plane frame is formed, a photographer can be informed that the photographic image plane frame as formed at least does not correspond to a photographic image plane frame state obtainable when the light blocking member is located at the maximum retracted position.

24 Claims, 35 Drawing Sheets

CAMERA HAVING VARIABLE-SIZED IMAGE PLANE AND IMAGE PLANE SIZE INDICATOR

This is a continuation application under 37 CFR 1.62 of prior application Ser. No. 08/046,075 filed on Apr. 12, 1993, now abandoned.

BACKGROUND OF THE INVENTION

1. Field of the Invention

The present invention relates to a camera or optical apparatus having switchable photographic image plane frames.

2. Description of the Related Art

Some types of cameras having "panorama" photography functions have heretofore been known. An adapter type of camera is provided with a panorama image plane frame which is attachable to its photographic image plane frame. Another type of camera is provided with a panorama image plane frame of the type which is selectively operative to open and close in directions parallel to the photographic optical axis in a space between a lens barrel and a camera body. However, such types of cameras have a number of disadvantages. The former type of camera needs a complicated operation for switching its standard photographic image plane frame to the panorama image plane frame, while the latter type of camera needs a large body.

To solve the above-described disadvantages, several examples of a camera provided with light blocking means are proposed in Japanese Patent Application No. Hei 4-3186. The light blocking means are disposed in the vicinity of a photographic image plane frame formed in a camera body and are arranged to form the panorama image plane frame by retractably moving toward each other in directions perpendicular to the optical axis of a photographic optical system and blocking light in part of the photographic image plane frame. The embodiment disclosed in the above-cited Japanese Patent Application No. Hei 4-3186 will be described below in brief with reference to FIGS. 26 through 35.

FIGS. 26 to 30 show a camera having a standard/panorama image plane switching mechanism which is proposed as a first example in the above-cited Japanese Patent Application No. Hei 4-3186.

FIG. 26 is a diagrammatic, front elevational view of a camera, and shows the state in which panorama blades are retracted from a photographic-lens optical path. FIG. 27 is a diagrammatic, front elevational view of the camera, and shows the state in which the panorama blades have entered the photographic-lens optical path. In FIGS. 26 and 27, the shown example includes a camera body 501, a camera-body image plane frame 501a, panorama blade guide pins 501b and 501c provided on the camera body 501, panorama blade stoppers 501d and 501e formed on the camera body 501, panorama blades 502 and 503 each of which is formed of a thin plate having a light block function like a shutter blade and is movable back and forth along a facing wall of the camera body 501 in directions perpendicular to the optical axis of a photographic lens. The shown example also includes rotation limiting guide slots 502a and 503a for causing the panorama blades 502 and 503 to move in parallel relation to each other, panorama blade driving levers 504 and 505 each of which is formed of a thin plate having a light blocking function. The panorama blade driving levers 504 and 505 are respectively held rotatably about shafts 506 and 507, and slots 504b and 505b are respectively provided in the extending end portions of the panorama blade driving levers 504 and 505. Shafts 508 and 509, which are respectively fixed to the panorama blades 502 and 503 and have thin flanges, are rotatably engaged with the corresponding slots 504b and 505b. The shown example also includes an arm 504a which is in contact with a pin 512 provided on a standard/panorama switching plate 510, the arm 504a being formed to receive an operating force each time the standard/panorama switching plate 510 is made to slide upward or downward, and an erected portion 505a which is in contact with the arm 504a in such a manner as to receive an operating force from the pin 512 disposed on the standard/panorama switching plate 510. The standard/panorama switching plate 510 has slide guide slots 510a at its upper and lower end portions, and the slide guide slots 510a are engaged with corresponding guide pins 501f provided on the camera body 501, so that the standard/panorama switching plate 510 is held in such a manner as to be rectilinearly movable in the upward and downward directions. Since click means (not shown), friction means (not shown) or the like acts on the standard/panorama switching plate 510 at the upper and lower ends of an operating stroke thereof, the standard/panorama switching plate 510 is securely retained at either of the upper and lower ends. A tension spring 511 is fixed to the camera body 501 at one end and hooked on the arm of the panorama blade driving lever 505 at the other end, thereby producing a turning force which causes the panorama blade driving lever 505 to turn about the shaft 507 in the counterclockwise direction. The counterclockwise turning force acts on the arm 504a of the panorama blade driving lever 504 via the erected portion 505a and the panorama blade driving lever 505 is subjected to a turning force which causes it to turn about the shaft 506 in the clockwise direction, whereby the panorama blades 502 and 503 are urged at all times in the direction in which panorama photography is enabled. A connecting lever 513 is held rotatably about a pin 501g provided on the camera body 501, and has a hole 513c at the extending end portion of its arm 513a. A shaft 514, which is fixed to the standard/panorama switching plate 510 and has a thin flange, is rotatably engaged with the hole 513c. A pin 515 is provided on the extending end portion of an arm 513b of the connecting lever 513. A standard/panorama switching lever 516 can be made to move rectilinearly in either of the rightward and leftward directions along slide guide holes 516a which are respectively engaged with guide pins 501h provided on the camera body 501. The left end portion of the standard/panorama switching lever 516 has a slot 516b with which the pin 515 is rotatably engaged, whereby the rectilinear motion of the standard/panorama switching lever 516 can be transmitted as the rotational motion of the connecting lever 513. The standard/panorama switching lever 516 also has an arm 516c which extends into the bottom portion of the camera to allow a photographer to arbitrarily perform a standard/panorama switching operation at the outside bottom face of the camera. A standard/panorama switching external knob 517 is fixed to the arm 516c.

In each of FIGS. 26 and 27, a two-dot chain line represents the external shape of the camera.

If panorama photography is to be performed, the above-described arrangement is operated as follows. First, the standard/panorama switching external knob 517 is manually slid toward the left along the bottom of the camera. At this time, since the standard/panorama switching lever 516 is also slid toward the left, the connecting lever 513 which is connected to the standard/panorama switching lever 516 by the pin 515 engaged with the slot 516b is turned about the shaft 501g in the clockwise direction. As the connecting lever 513 turns in the clockwise direction, the standard/panorama switching plate 510 which is linked to the extending end of the arm 513a is pushed straight upward by the cooperative action of the guide pins 501f and the respective slide guide slots 510a. At this time, since the pin 512 also moves upward, the panorama blade driving lever 504, which is rotationally urged by the tension spring 511 in the direction in which it is maintained in contact with the pin 512 (in the clockwise direction), is turned about the shaft 506 in the clockwise direction. Simultaneously, the panorama blade driving lever 505 (which is urged to turn in the counterclockwise direction by the tension spring 511 and is maintained in contact with the arm 504a of the panorama blade driving lever 504 at the erected portion 505a) is turned about the shaft 507 in the counterclockwise direction. In this manner, as shown in FIG. 27, the panorama blades 502 and 503 are made to enter a photographic image plane along the facing wall of the camera body 501, and stop at the positions where the respective end faces of the panorama blades 502 and 503 are brought into contact with the panorama blade stoppers 501d and 501e, thereby blocking light in the upper and lower portions of the photographic image plane to form a panorama image plane.

If the panorama photography is to be cancelled to conduct photography corresponding to the standard image plane frame, the standard/panorama switching external knob 517 may be manually slid toward the right until the state shown in FIG. 26 is obtained.

However, the above-described arrangement has the following disadvantages since it operates as described above for the purpose of achieving the switching operation of the panorama blades 502 and 503.

A complicated arrangement and a large number of parts are required, such as the panorama blade driving levers 504 and 505, the standard/panorama switching plate 510 and the connecting lever 513 and, in addition, dowels or pins provided at the connecting portions of the individual levers. Accordingly, the above-described example is inconvenient for miniaturization of cameras because a space is needed within the camera body.

Also, since the complicated arrangement and a large number of connecting portions are required, the above-described example is inferior in operational efficiency as well as in operational reliability and durability.

Further, the complicated arrangement and the large number of parts lead to inferior assembly efficiency, too many manufacturing steps and increased part costs, with the result that large economic demerits are incurred.

FIGS. 28 to 30 schematically show only portions directly related to the movement of the panorama blades in the arrangement shown in FIGS. 26 and 27 for the purpose of a better understanding of the movement of the panorama blades. FIG. 28 is a schematic view showing a panorama photography state, FIG. 29 is a schematic view showing a standard photography state, and FIG. 30 is a schematic view showing a state in which the panorama blades are moving between the panorama photography state and the standard photography state. In each of these figures, the same reference numerals are used to denote constituent elements which are identical to those shown in FIGS. 26 and 27.

In the arrangement shown in FIGS. 28 to 30, as described previously, the panorama blades 502 and 503 are rectilinearly moved toward and away from each other in the height direction of the camera by the rotational motions of the associated panorama blade driving levers 504 and 505. For this reason, since it is necessary to provide clearances around the respective shafts 508 and 509 which constitute linking portions, the slots 504b and 505b are provided in the levers 504 and 505, respectively.

However, because of the presence of the slots 504b and 505b, the panorama blades 502 and 503 easily fluctuate in position toward the right or the left about the respective panorama blade guide pins 501b and 501c provided on the camera body 501. Such a positional fluctuation tends to become large, particularly during the standard photography state in which the panorama blade stoppers 501d and 501e do not act on the corresponding panorama blades 502 and 503, that is, the panorama blade stoppers 501d and 501e are out of contact with the end portions of the corresponding panorama blades 502 and 503 (refer to FIG. 29) or during the time when the panorama blades 502 and 503 are moving (refer to FIG. 30). (In FIGS. 29 and 30, the states of positional fluctuations of the respective panorama blades 502 and 503 are represented by two-dot chain lines.) If the positional fluctuations take place during the standard photography state, part of the panorama blade 502 or 503 may block light in part of the optical path of the photographic lens to produce an improper image plane. If the positional fluctuations take place during the time when the panorama blades 502 and 503 are moving, the operational reliability or quality of the camera is remarkably degraded and the durability deteriorates.

FIGS. 31 to 33 show a standard/panorama image plane switching mechanism which is proposed as a second example in the above-cited Japanese Patent Application No. Hei 4-3186. In the second example, a panorama blade 603 is arranged to move rectilinearly up and down by a predetermined stroke in the camera and a panorama blade driving lever 604 having a turning axis is linked to the panorama blade 603. A panorama blade 602 is linked to the panorama blade 603 by the panorama blade driving lever 604 in such a manner that the panorama blade 602 also moves rectilinearly up and down in the camera.

In the second example, although the panorama blade 603 on the lower side is stable since it moves rectilinearly up and down by the predetermined stroke in the camera, the arrangement of the panorama blade 602 on the upper side is basically identical to that of the panorama blade 502 used in the first example. To cause the panorama blade 602 to move rectilinearly up and down in the camera by means of the rotational motion of the panorama blade driving lever 604, it is necessary to provide a clearance around the shaft 608 which constitutes a linking portion. For this reason, a slot 604b is provided in the panorama blade driving lever 604.

As a result, similarly to the first example, the panorama blade 602 easily fluctuates in position toward the right or the left about a panorama blade guide pin 601b. Such a positional fluctuation tends to become large, particularly during the standard photography state (refer to FIG. 32) or during a movement of the panorama blade 602 (refer to FIG. 33). (In FIGS. 32 and 33, the state of positional fluctuations of the panorama blade 602 is represented by two-dot chain lines.)

FIGS. 34 and 35 show a standard/panorama image plane switching mechanism which is proposed as a third example in the above-cited Japanese Patent Application No. Hei 4-3186. In the third example, panorama blades 702 and 703 are arranged to rotationally move about a common turning axis.

In the third example, since the panorama blades 702 and 703 rotationally move in direct relation as shown in FIGS. 34 and 35, the extending end portions of the respective panorama blades 702 and 703 need to be retracted from the photographic image plane frame by a large amount, particularly during the standard photography state shown in FIG. 35. As a result, since a large two-dimensional (planar) space is needed, the design of the arrangement of the camera is greatly limited.

SUMMARY OF THE INVENTION

A primary object of the present invention is, therefore, to solve the problems of the above-described related arts.

To achieve this object, according to one aspect of the present invention, there is provided a camera having switchable photographic image plane frames, which comprises light blocking means capable of blocking part of a photographic light flux and movable in at least a photographic optical path, switching means arranged to switch a state thereof at a point in a process in which the light blocking means reaches its middle point during a movement from its maximum retracted position relative to the photographic optical path to its maximum advanced position, and display means for providing a display according to the state of the switching means. According to the aforesaid arrangement, even if the light blocking means stops at a halfway position to block light halfway in part of a photographic image plane, it is possible to issue a warning to a photographer. Accordingly, it is possible to prevent the photographer from carrying out photography intended for a photographic image plane state obtained when the light blocking means is located at the maximum retracted position, whereby it is possible to prevent the photographer from producing a failed photograph in which a subject image is partially lost.

According to another aspect of the present invention, there is provided a camera having switchable photographic image plane frames, which comprises light blocking means capable of blocking part of a photographic light flux and movable in at least a photographic optical path, urging means for imparting an urging force to the light blocking means, a direction of the urging force being changed at a position in the process of a movement of the light blocking means, switching means arranged to switch a state thereof at a point in a process in which the light blocking means moves from its maximum retracted position relative to the photographic optical path to the position where the direction of the urging force imparted by the urging means is changed, and display means for providing a display according to the state of the switching means. According to the aforesaid arrangement, even if the light blocking means stops at a position, where the direction of the urging force of the urging means changes, and blocks light halfway in part of a photographic image plane, it is possible to issue a warning to the photographer. Accordingly, it is possible to prevent the photographer from carrying out photography intended for a photographic image plane state obtained when the light blocking means is located at the maximum retracted position, whereby it is possible to prevent the photographer from producing a failed photograph in which a subject image is partially lost.

According to another aspect of the present invention, there is provided a camera having switchable photographic image plane frames, which comprises at least two light blocking members capable of blocking part of a photographic light flux and movable in at least a photographic optical path, each of the at least two light blocking members being formed as a single member, and a lever member having at least two working parts for directly driving the at least two light blocking members. According to the aforesaid arrangement, it is possible to reduce the required number of constituent parts by means of a simple construction having a reduced number of connecting portions, whereby it is possible to provide further miniaturized cameras. In addition, it is possible to improve the operational reliability and durability of the camera having such switchable photographic image plane frames.

According to another aspect of the present invention, there is provided a camera having switchable photographic image plane frames, which comprises a light blocking member capable of blocking part of a photographic light flux and movable in at least a photographic optical path, a moving member pivotally supporting the light blocking member and arranged to turn to move the light blocking member, a cam portion having a cam displacement corresponding to a movement locus of the light blocking member, and a cam follower which follows the cam displacement of the cam portion, either one of the cam portion and the cam follower being arranged on the light blocking member and the other being arranged on another member. According to the aforesaid arrangement, it is possible to prevent the light blocking member from undergoing positional fluctuations when it is held in the state of being located at the maximum retracted position relative to the photographic optical path or during a photographic image plane frame switching operation, by means of the aforesaid simple arrangement and without increasing the size of the camera. Furthermore, it is possible to prevent the operational reliability or quality of the camera from being remarkably degraded by the positional fluctuations during the switching operation, whereby the durability of the camera can be improved.

According to still another aspect of the present invention, there is provided a camera having switchable photographic image plane frames, which comprises a light blocking member capable of blocking part of a photographic light flux and movable in at least a photographic optical path, and a guide member for coming into contact with an edge portion of the light blocking member and guiding the light blocking member in such a manner that the light blocking member is displaceable in parallel. According to the aforesaid arrangement, it is possible to prevent the light blocking member from undergoing positional fluctuations when it is held in the state of being located at the maximum retracted position relative to the photographic optical path or during a photographic image plane frame switching operation, by means of the aforesaid simple arrangement and without increasing the size of the camera. Furthermore, it is possible to prevent the operational reliability or quality of the camera from being remarkably degraded by the positional fluctuations during the switching operation, whereby the durability of the camera can be improved.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

[First Embodiment]

Figure 1:
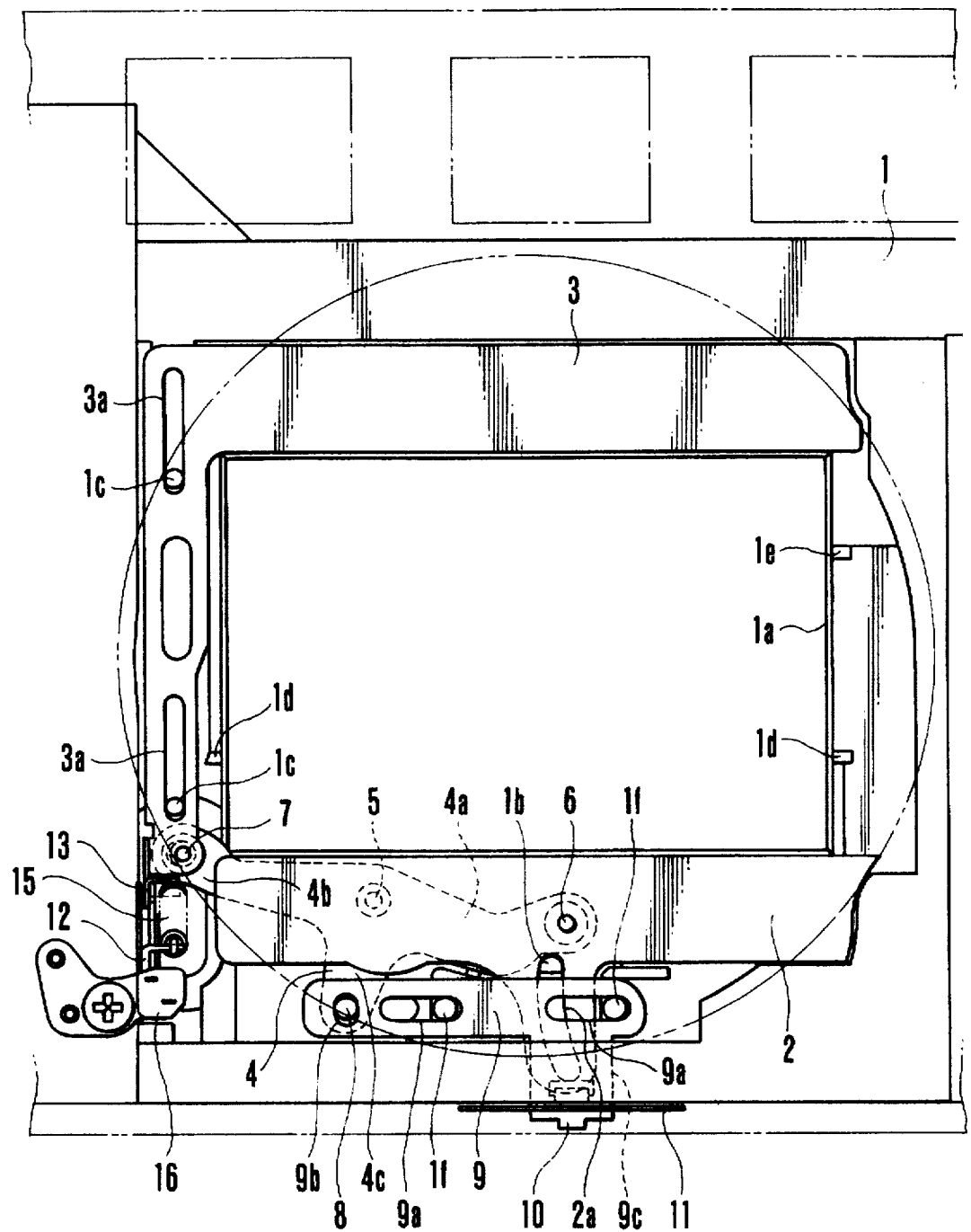
FIGS. 1 is a diagrammatic, front elevational view of the arrangement of the essential portions of a camera according to a first embodiment of the present invention, showing the standard photography state in which panorama blades are retracted from a photographic-lens optical path.
Figure 2:
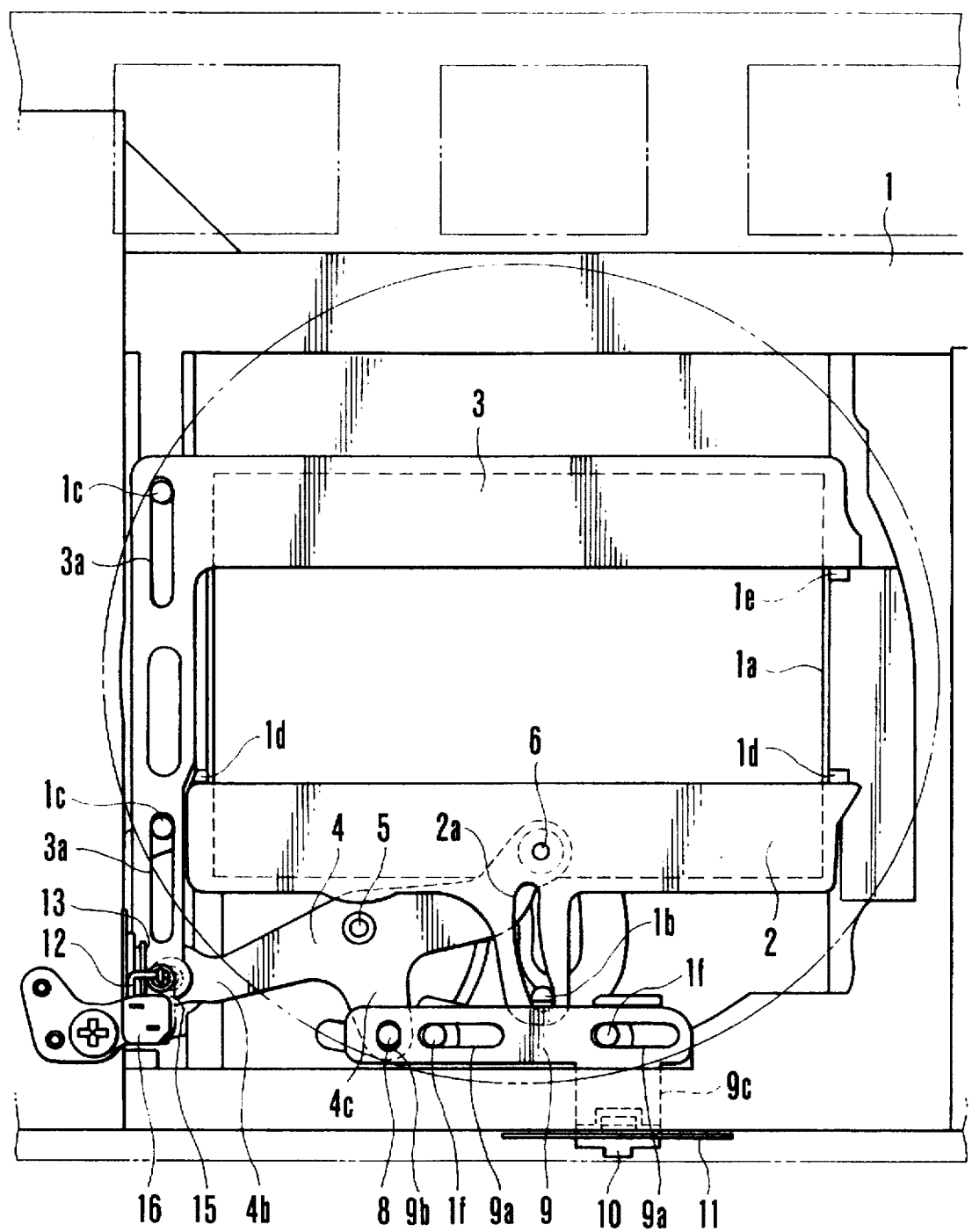
FIG. 2 is a diagrammatic, front elevational view of the arrangement of the essential portions of the camera, showing the panorama photography state in which the panorama blades shown in FIG. 1 have entered the photographic-lens optical path to block light in the upper and lower portions of an image plane.
Figure 3:
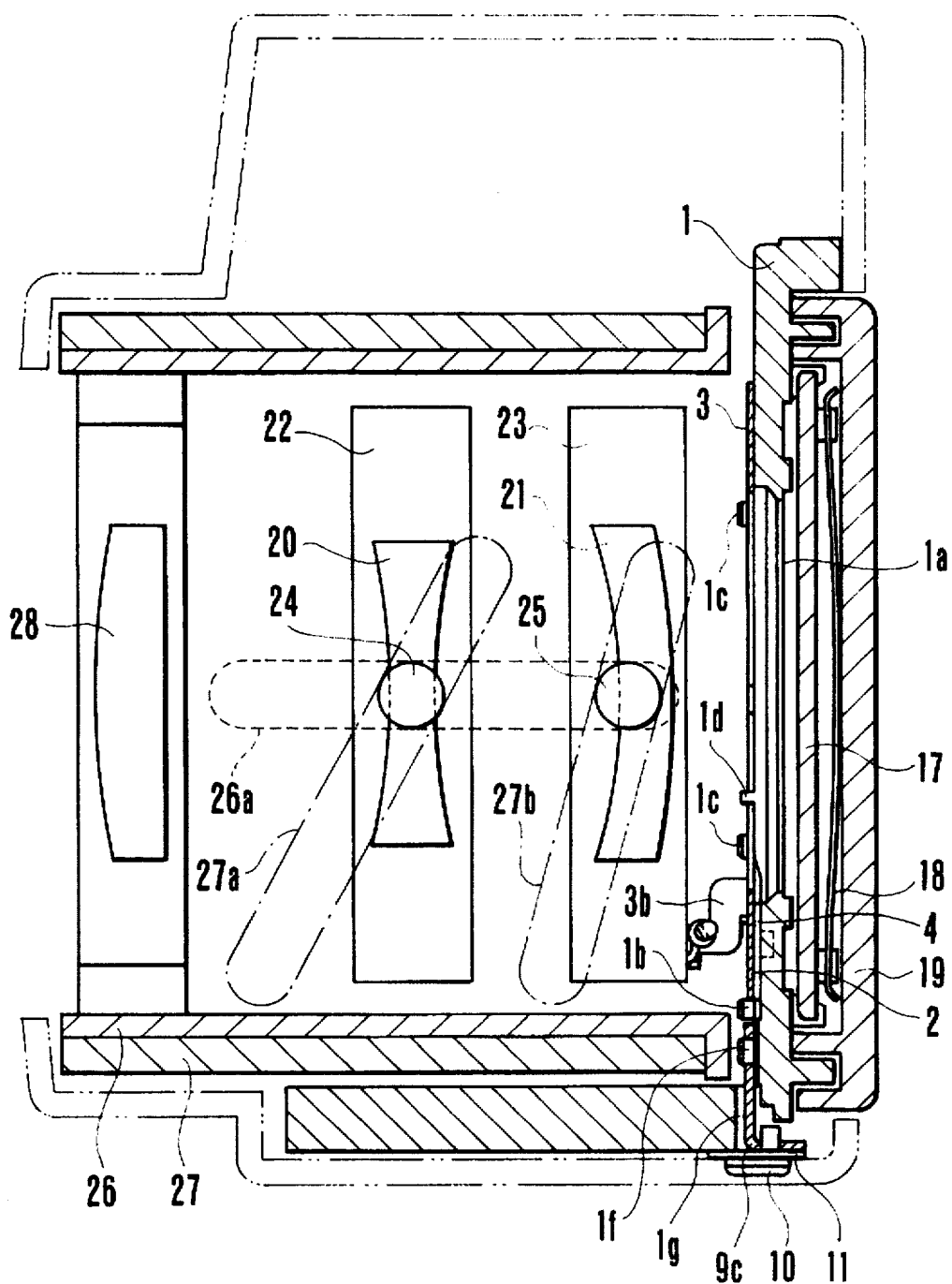
FIG. 3 is a vertical sectional view of the central portion of the camera which is placed in the state of FIG. 1.

FIGS. 1 through 10 show a first embodiment of the present invention. FIG. 1 is a diagrammatic, front elevational view of the arrangement of the essential portions of a camera, and shows the state (standard photography state) in which light blocking members for forming a panorama image plane frame (hereinafter referred to as "panorama blades") are retracted from a photographic-lens optical path. FIG. 2 is a diagrammatic, front elevational view of the arrangement of the essential portions of the camera, and shows the state (panorama photography state) in which the panorama blades have entered the photographic-lens optical path to block light in the upper and lower portions of an image plane. FIG. 3 is a vertical sectional view of the central portion of the camera which is placed in the state of FIG. 1.

Figure 4:
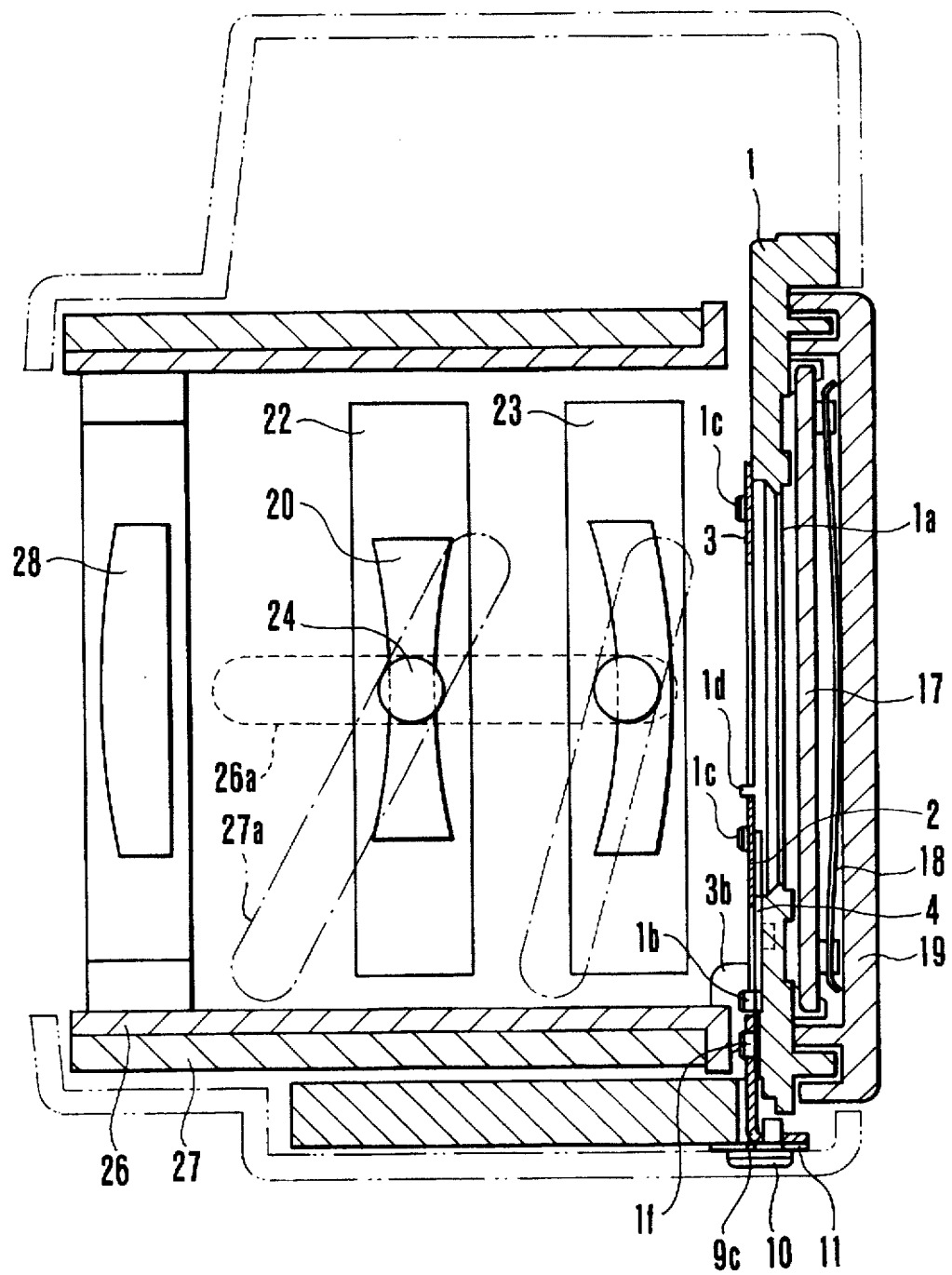
FIG. 4 is a vertical sectional view of the central portion of the camera which is placed in the state of FIG. 2.
Figure 5:
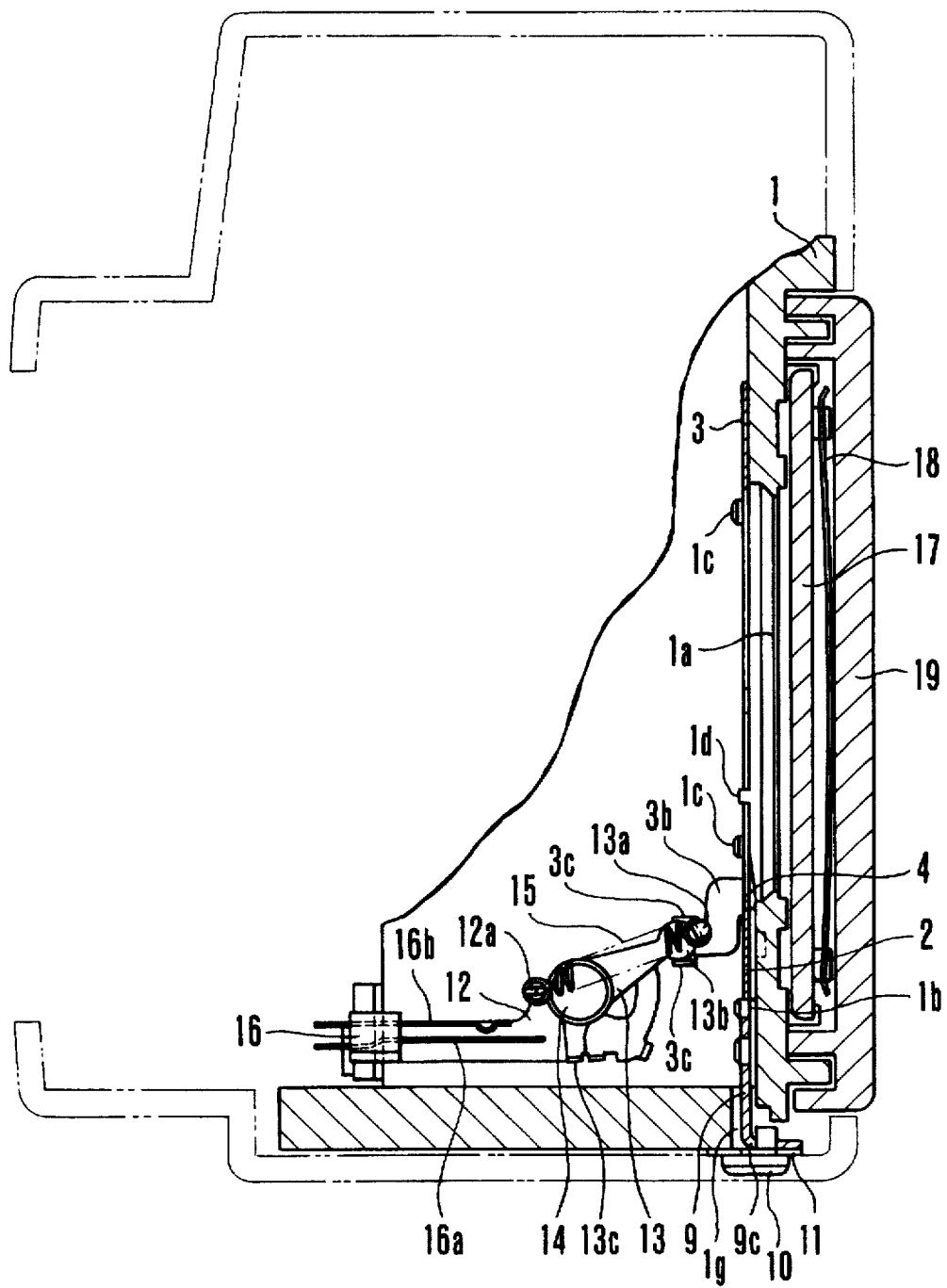
FIG. 5 is a vertical sectional view of the central portion of the camera, showing a mechanism for generating a click force during a standard/panorama photography state switching operation with the photographic lens shown in FIG. 3 being omitted for the sake of simplicity.
Figure 6:
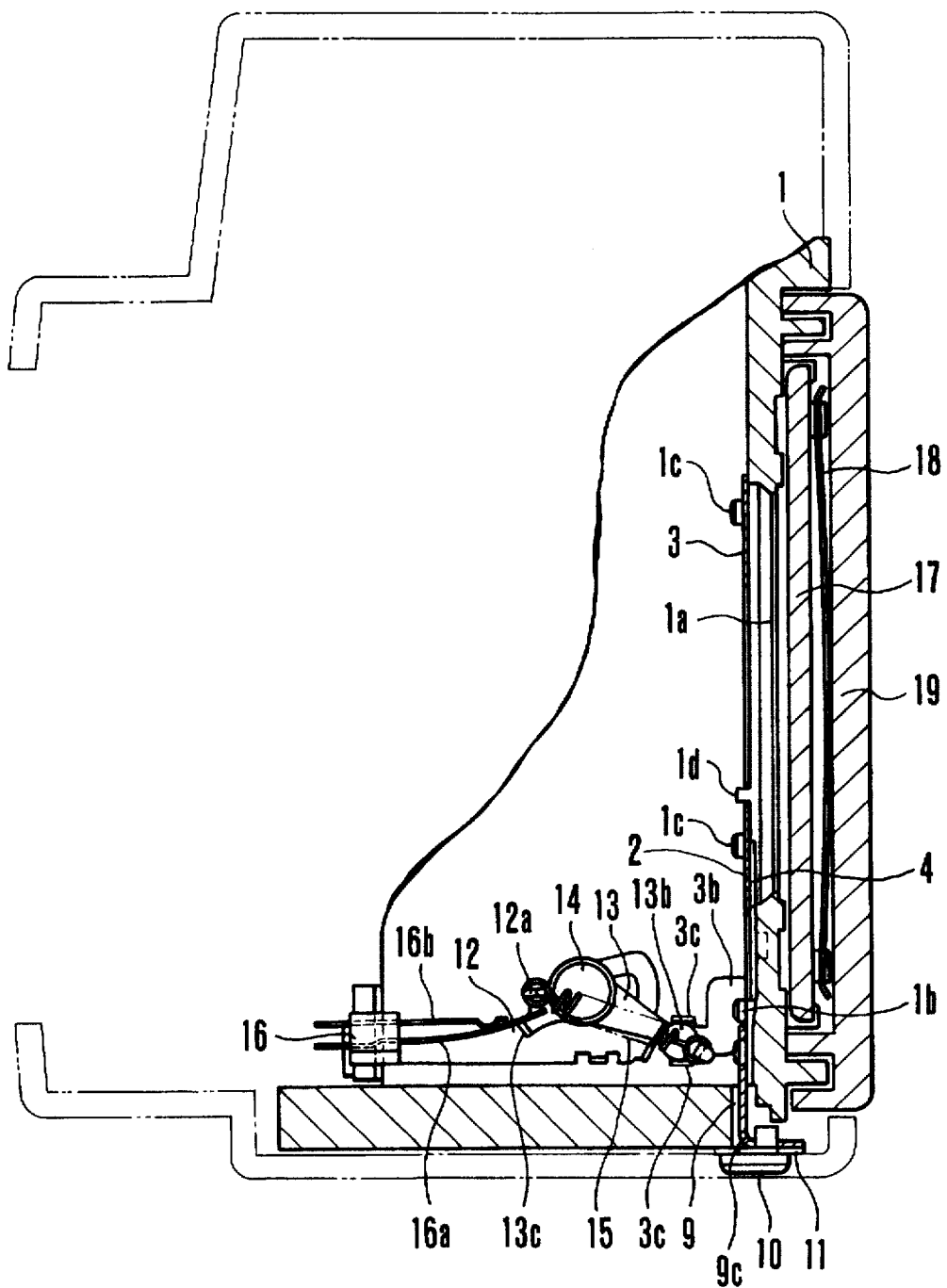
FIG. 6 is a vertical sectional view of the central portion of the camera, showing the mechanism for generating the click force during the standard/panorama photography state switching operation with the photographic lens shown in FIG. 4 being omitted for the sake of simplicity.
Figure 7:
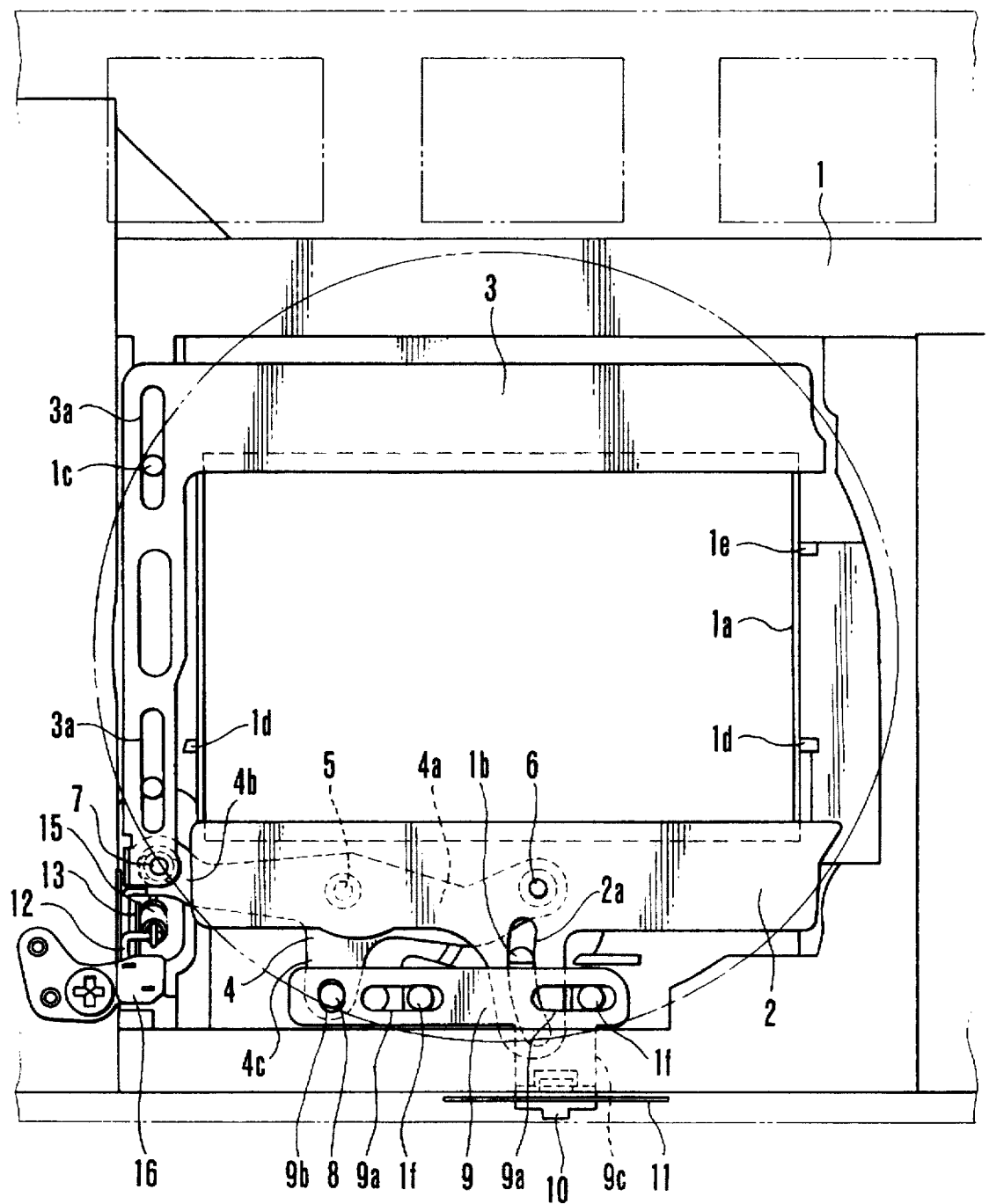
FIG. 7 is a diagrammatic, front elevational view of the essential portions of the camera according to the first embodiment of the present invention, showing a state in which the panorama blades have entered the photographic-lens optical path to slightly block light in the upper and lower portions of the image plane.
Figure 8:
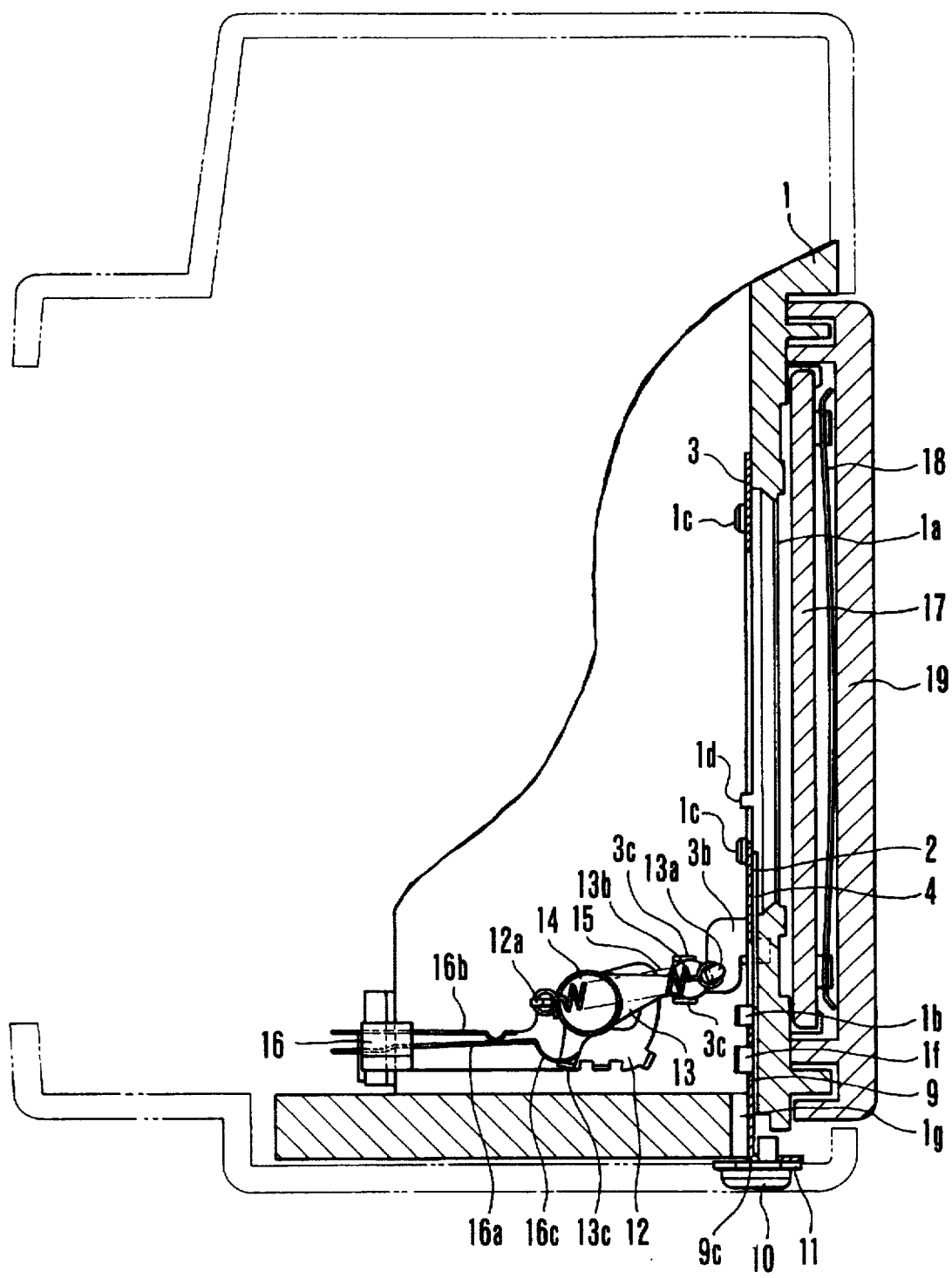
FIG. 8 is a vertical sectional view of the central portion of the camera which is placed in the state shown in FIG. 7, showing the mechanism for generating the click force during the standard/panorama photography state switching operation with the photographic lens omitted for the sake of simplicity.
Figure 9:
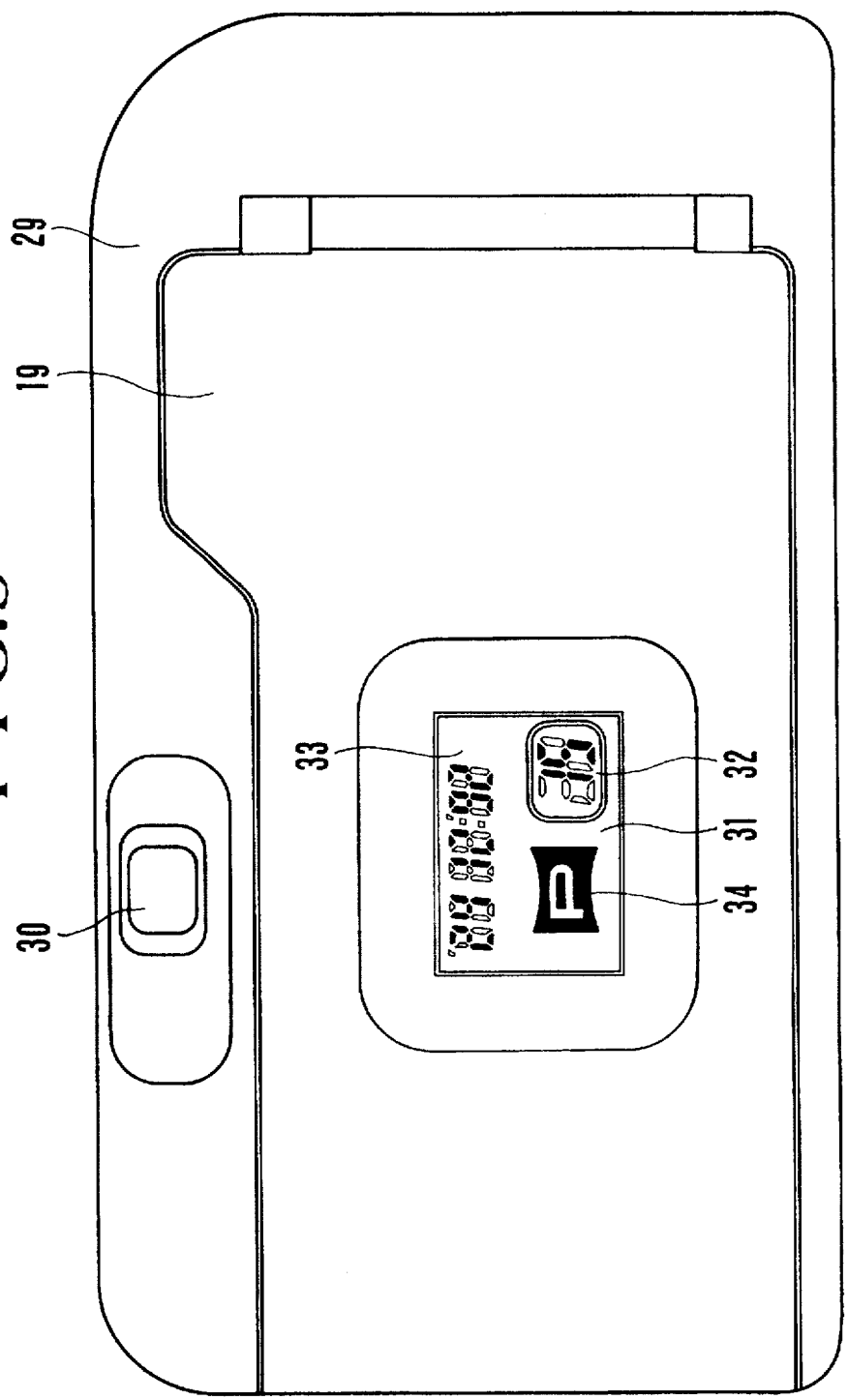
FIG. 9 is a back elevational view of the external appearance of the camera, showing the panorama photography state.
Figure 10:
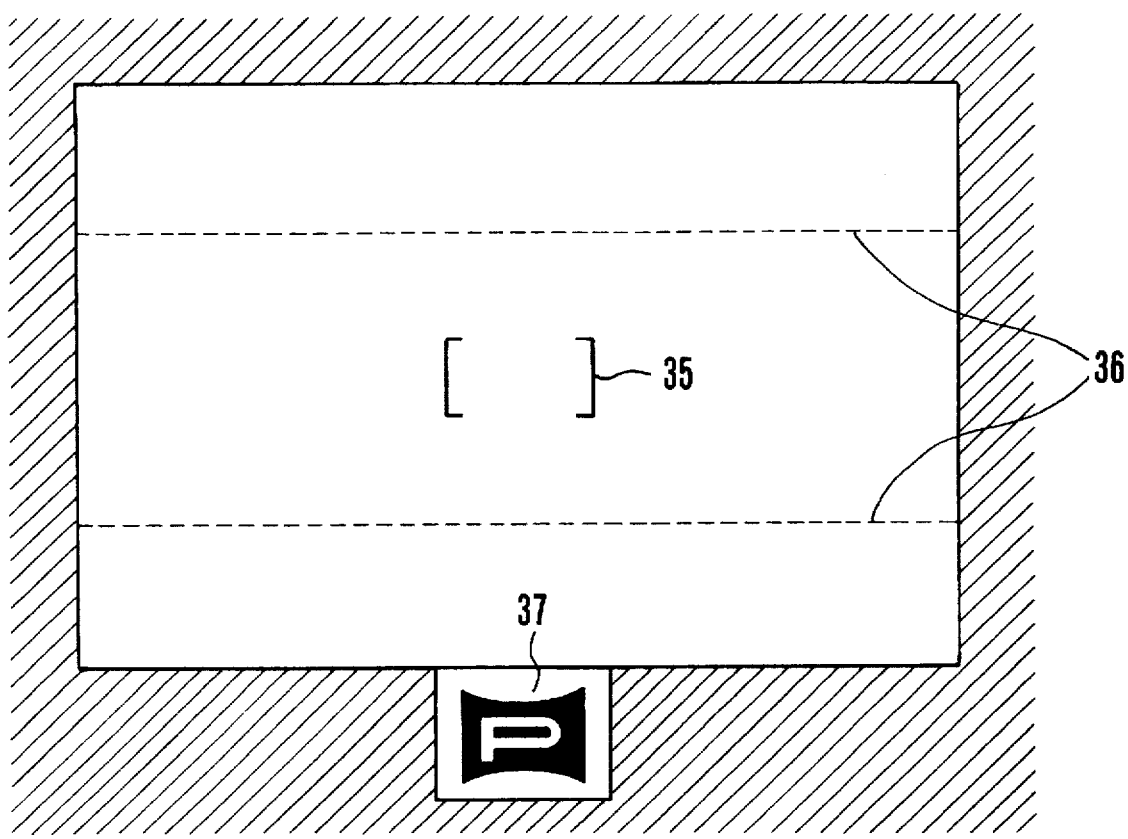
FIG. 10 is a view showing a viewfinder screen which is observed within the viewfinder of the camera.

FIG. 4 is a vertical sectional view of the central portion of the camera which is placed in the state of FIG. 2. FIG. 5 is a vertical sectional view of the central portion of the camera, and shows a mechanism for generating a click force during a standard/panorama photography state switching operation with the photographic lens shown in FIG. 3 being omitted for the sake of simplicity. FIG. 6 is a vertical sectional view of the central portion of the camera, and shows the mechanism for generating the click force during the standard/panorama photography state switching operation with the photographic lens shown in FIG. 4 being omitted for the sake of simplicity. FIG. 7 is a diagrammatic, front elevational view of the essential portions of the camera, and shows the state (panorama switching halfway state) in which the panorama blades are made to enter the photographic-lens optical path and slightly block light in the upper and lower portions of an image plane. FIG. 8 is a vertical sectional view of the central portion of the camera which is placed in the state shown in FIG. 7, and shows the mechanism for generating the click force during the standard/panorama photography state switching operation with the photographic lens omitted for the sake of simplicity. FIG. 9 is a back elevational view of the external appearance of the camera as viewed from the back-lid side. FIG. 10 is a view showing a viewfinder screen which is observed within the viewfinder of the camera.

The arrangement shown in these figures includes a camera body 1, a camera-body image plane frame 1a, panorama blade guide pins 1b and 1c provided on the camera body 1, panorama blade stoppers 1d and 1e formed on the camera body 1, and panorama lever guide pins if provided on the camera body 1. A slot 1g (refer to FIG. 3) is provided in the camera body 1, and a standard/panorama switching lever 9 which will be described later is inserted through the slot 1g so that a standard/panorama switching operation can be arbitrarily performed at the external bottom face of the camera.

The shown arrangement also includes panorama blades 2 and 3 for forming a panorama image plane frame, each of which is formed of a thin plate having a light block function like a shutter blade and is movable back and forth along a facing wall of the camera body 1 in directions perpendicular to the optical axis of a photographic lens. The shown arrangement also includes a rotation limiting guide slot 2a for causing the panorama blade 2 to move in parallel relation to the panorama blade 3, and the rotation limiting guide slot 2a has an arcuate shape corresponding to the movement locus of the panorama blade 2 and is engaged with the panorama blade guide pin 1b. The panorama blade 3 has an L-like shape in front elevation, and is rectilinearly movable in the upward and downward directions as viewed in FIGS. 1 and 2 by means of slide guide slots 3a with which the panorama blade guide pins 1c are engaged.

A panorama blade driving lever 4, which has an approximately T-like shape in front elevation, is held rotatably about a shaft 5, and a hole is formed in the extending end portion of an arm 4a. A shaft 6 having a thin flange is fixed to the panorama blade 2 and is rotatably engaged with the hole, whereby the panorama blade driving lever 4 is linked to the panorama blade 2. A slot is formed in the extending end portion of another arm 4b, and a shaft 7 having a thin flange is fixed to the panorama blade 3 and is rotatably engaged with the slot, whereby the panorama blade driving lever 4 is linked to the panorama blade 3. A pin 8 is fixed to the extending end portion of still another arm 4c.

The standard/panorama switching lever 9 can be made to move rectilinearly in either of the rightward and leftward directions along slide guide holes 9a which are respectively engaged with guide pins 1f. The left end portion of the standard/panorama switching lever 9 has a slot 9b with which the pin 8 is rotatably engaged, whereby the rectilinear motion of the standard/panorama switching lever 9 can be transmitted as the rotational motion of the panorama blade driving lever 4. The standard/panorama switching lever 9 also has an arm 9c which extends through the bottom portion of the camera to allow a photographer to arbitrarily perform a standard/panorama switching operation at the outside bottom face of the camera.

A standard/panorama switching external knob 10 is fixed to the arm 9c of the standard/panorama switching lever 9 with a light blocking sheet 11 clamped therebetween. A toggle base plate 12 is secured at a location along a side wall of the camera body 1 on a lens-barrel mounting side, and holds a toggle lever 13 rotatably about a shaft 14.

A toggle spring 15 is hooked with a predetermined tension between an erected hook 12a provided on the toggle base plate 12 and an erected hook 13a provided at the extending end of the toggle lever 13. The toggle spring 15 serves to impart to the toggle lever 13 a unidirectional rotational force of which switches according to the rotational position of the toggle lever 13 (a so-called toggle action). A round head 13b is formed at the extending end of the toggle lever 13, and is rotatably fitted into a space between L-shaped bends 3c provided at the extending end of an erected portion 3b of the panorama blade 3. By the toggle action, a displacing force is efficiently imparted in the directions of the respective movement ends of the upward and downward rectilinear movements of the panorama blade 3.

A standard/panorama detecting switch 16 includes two contact pieces 16a and 16b (refer to FIGS. 5 and 6). When the extending end of the contact piece 16a is pressed by an erected portion 13c provided at the end of one arm of the toggle lever 13, a projection of the contact piece 16b and the contact piece 16a are brought into contact with each other to provide electrical conduction, whereby a signal indicating that the panorama photography state has been set is transmitted to a control circuit (not shown) of the camera.

A film pressure plate 17 is provided on a back lid 19 (refer to FIG. 3). When the back lid 19 is closed, the film pressure plate 17 is pressed from the back by a film pressure spring 18 to retain the film between the film pressure plate 17 and a rail part provided on the camera body 1, thereby holding the flatness of a loaded film.

As shown in FIGS. 3 and 4, a zooming lens which constitutes part of the photographic lens is arranged as follows.

A variator 20 and a compensator 21 are held by holders 22 and 23, respectively. Rollers 24 and 25 provided on the respective holders 22 and 23 are guided by a rectilinear groove 26a of a fixed tube 26, whereby the variator 20 and compensator 21 are moved along the optical axis of the photographic lens. The rollers 24 and 25 are also respectively engaged with zooming cam grooves 27a and 27b of a cam ring 27 which rotates about the optical axis, and move the variator 20 and the compensator 21 to their predetermined positions along the optical axis in accordance with the rotational operation of the cam ring 27, i.e., perform zooming. In FIGS. 3 and 4, a focusing lens is indicated by reference numeral 28.

Referring to FIG. 9 which shows the back-lid side of the camera, the camera includes a cover 29, a viewfinder eyepiece window 30, a liquid-crystal display 31 provided on the back lid 19, a number-of-exposures display 32 provided in the liquid-crystal display 31, a data display 33 provided in the liquid-crystal display 31, and a panorama photography mode display 34 provided in the liquid-crystal display 31. When the contact pieces 16a and 16b of the standard/panorama detecting switch 16 make contact with each other to provide electrical conduction, the panorama photography mode display 34 is turned on to display a "P" mark.

Referring to FIG. 10, an index 35 serves as a focus detecting mark for autofocus, and when the mark 35 is aimed at a subject to be photographed, focusing is automatically performed by an autofocus mechanism (not shown). Panorama photography image plane indication lines 36 indicate that the area defined between two upper and lower dashed lines can be photographed on the film. A panorama photography mode display 37 is provided in the viewfinder, and when the contact pieces 16a and 16b of the standard/panorama detecting switch 16 make contact with each other to provide electrical conduction, the panorama photography mode display 37 is turned on to display the "P" mark.

If panorama photography is to be performed, the above-described arrangement is operated as follows. First, the standard/panorama switching external knob 10 is manually slid toward the right along the bottom of the camera against the displacing force of the above-described toggle action. At this time, since the standard/panorama switching lever 9 is also slid toward the right as viewed in FIG. 1, the panorama blade driving lever 4 is turned about the shaft 5 in the counterclockwise direction by the action of the pin 8 engaged with the slot 9b. As the panorama blade driving lever 4 turns in the counterclockwise direction, the panorama blade 2 which is linked to the extending end of the arm 4a is pulled upward. At this time, the panorama blade 2 is moved upward (in a direction perpendicular to the optical axis) without fluctuation while maintaining its parallel relation to the panorama blade 3 by the cooperative action of the panorama blade guide pin 1b and the rotation limiting guide slot 2a. Simultaneously, the panorama blade 3 which is linked to the extending end of the arm 4b of the panorama blade driving lever 4 is pulled downward, whereby the panorama blade 3 is rectilinearly moved while maintaining its parallel relation to the panorama blade 2 by the cooperative action of the panorama blade guide pin 1c and the slide guide slots 3a.

When the amount of the sliding movement of each of the panorama blades 2 and 3 exceeds half of the amount required to effect switching to panorama photography, a force, which acts in the direction in which the toggle lever 13 is turned counterclockwise as shown in FIG. 5, that is, in the direction in which the panorama blade 3 is displaced upward, is switched to a force which acts in the direction in which the toggle lever 13 is turned clockwise as shown in FIG. 6, that is, in the direction in which the panorama blade 3 is displaced downward. Thus, the operator can obtain a distinct click touch, while the panorama blades 2 and 3 are reliably displaced to and held at the positions where their respective end faces are maintained in contact with the panorama blade stoppers 1d and 1e as shown in FIG. 2, thereby blocking light in the upper and lower portions of a standard photographic image plane frame to form the panorama image plane frame. At this time, the contact pieces 16a and 16b of the standard/panorama detecting switch 16 are placed in an electrically conductive state by the erected portion 13c of the toggle lever 13 as shown in FIG. 6, and the fact that the panorama photography state has been set is detected by the control circuit (not shown) of the camera.

The "P" marks 34 and 37 of FIGS. 9 and 10 which indicate that the panorama photography mode has been set are displayed on the liquid-crystal display 31 provided in the back lid 19 and in the viewfinder, respectively.

If the panorama photography state of FIG. 2 is to be cancelled to conduct photography corresponding to the standard photography state of FIG. 1, the standard/panorama switching external knob 10 which is provided at the external bottom face of the camera as shown in FIG. 2 is manually slid toward the left along the bottom of the camera against the displacing force of the toggle action. Then, operations reverse to the above-described operations are performed to reach the state shown in FIG. 1. In this case as well, the operator can obtain a distinct click touch owing to the toggle action, while the panorama blades 2 and 3 are reliably displaced to and held at the positions where the panorama blades 2 and 3 are kept open. Accordingly, a proper image plane corresponding to the standard photography state, which is formed by the camera-body image plane frame 1a, is prevented from being impaired. The standard/panorama detecting switch 16 is placed into an electrically non-conductive state as shown in FIG. 5, and the fact that the standard photography state has been set is detected by the control circuit (not shown) of the camera. Thus, the "P" marks 34 and 37 shown in FIGS. 9 and 10 are turned off to indicate that the standard photography mode is selected (the panorama photography mode is not selected).

If the panorama photography is to be cancelled to conduct switching to the standard photographic image plane, both or either of the panorama blades 2 and 3 may also be directly forced open with a finger.

It is to be noted that the above-described panorama mechanism may be constructed as a structure which can be handled as one unit. In the structure, a base plate (not shown) is provided in the space between the camera body 1 and the panorama blades 2 and 3, and the panorama blade guide pins 1b and 1c, the panorama blade stoppers 1d and 1e, the panorama lever guide pins if and other associated parts are provided on the base plate. After the required parts have been mounted on the base plate, the base plate is fixed to the camera body 1.

In the first embodiment, as described previously, the toggle mechanism is used as the standard/panorama image plane switching mechanism. Such a toggle mechanism has a dead point which corresponds to a neutral position of the toggle lever 13 and at which no urging force works. If the standard/panorama switching external knob 10 is stopped at the dead point, the panorama blades 2 and 3 stop at a halfway position which does not correspond to a perfect panorama photography state, so that light is partially blocked in the photographic image plane. During the state of light being partially blocked in the photographic image plane, if no warning display is provided, a photographer will carry out photography intended for the standard photography state and take a failed photograph in which a subject is photographed with its upper and lower portions lost. For this reason, in the first embodiment, the aforesaid case is prevented by utilizing the relationship between the toggle mechanism and the display as will be described below.

If the standard/panorama switching external knob 10 is manually slid to the right by a small amount in the direction in which switching from the standard photography state to the panorama photography state is effected, operations similar to the above-described ones are performed and the panorama blades 2 and 3 slightly block light in the upper and lower portions of the photographic image plane as shown in FIG. 7. At this time, as shown in FIG. 8, the toggle lever 13 has not yet reached the neutral position (the dead point) at which the toggle lever 13 does not exert an urging force on the panorama blade 3, and the force still acts in the direction in which the toggle lever 13 is turned counterclockwise, that is, in the direction in which the panorama blade 3 is displaced upward. (Accordingly, if the photographer removes his finger from the standard/panorama switching external knob 10, the panorama blades 2 and 3 are reset to the standard photography state.) Simultaneously, a large arcuate portion 16c of the extending end of the contact piece 16a is early pressed by the erected portion 13c of the toggle lever 13 to bring the contact pieces 16a and 16b of the standard/panorama detecting switch 16 into contact with each other, whereby the contact pieces 16a and 16b are placed into an electrically conductive state and the fact that the panorama blades 2 and 3 block light in the upper and lower portion of the photographic image plane is detected by the circuit (not shown). Then, the "P" marks shown in FIGS. 9 and 10 are turned on to issue a warning to the photographer. It is to be noted that at the time when the standard/panorama switching external knob 10 is slid up to this position, the toggle lever 13 is still urged in the direction in which the erected portion 13c of the toggle lever 13 is pressed backward, that is, in the direction in which the toggle lever 13 is turned counterclockwise, by the large arcuate portion 16c of the extending end of the movable-side contact piece 16a of the standard/panorama detecting switch 16. Accordingly, if the photographer removes his finger from the standard/panorama switching external knob 10, the panorama blades 2 and 3 can be easily reset to the standard photography state.

If the standard/panorama switching external knob 10 is manually slid further in the direction in which panorama photography is enabled, the panorama blades 2 and 3 reach approximately middle positions of their respective predetermined strokes and are placed into the state of blocking light in the upper and lower portions of the photographic image plane by a corresponding amount. At this time, the toggle lever 13 reaches the neutral position (the dead point) at which the toggle lever 13 does not exert an urging force on the panorama blade 3, and if the finger is removed from the standard/panorama switching external knob 10, the panorama blades 2 and 3 would stop in the aforesaid state. However, since the contact pieces 16a and 16b of the standard/panorama detecting switch 16 have already been brought into contact with each other and placed in the electrically conductive state, the "P" marks 34 and 37 are turned on in the liquid-crystal display 31 of the back lid 19 and in the viewfinder, thereby informing the photographer that the panorama blades 2 and 3 block light in the upper and lower portions of the photographic image plane. Accordingly, it is possible to prevent the photographer from failing in photography, for example, erroneously carrying out photography intended for the standard photography state and taking a photograph of a subject with its upper and lower portions lost.

[Second Embodiment]

Figure 11:
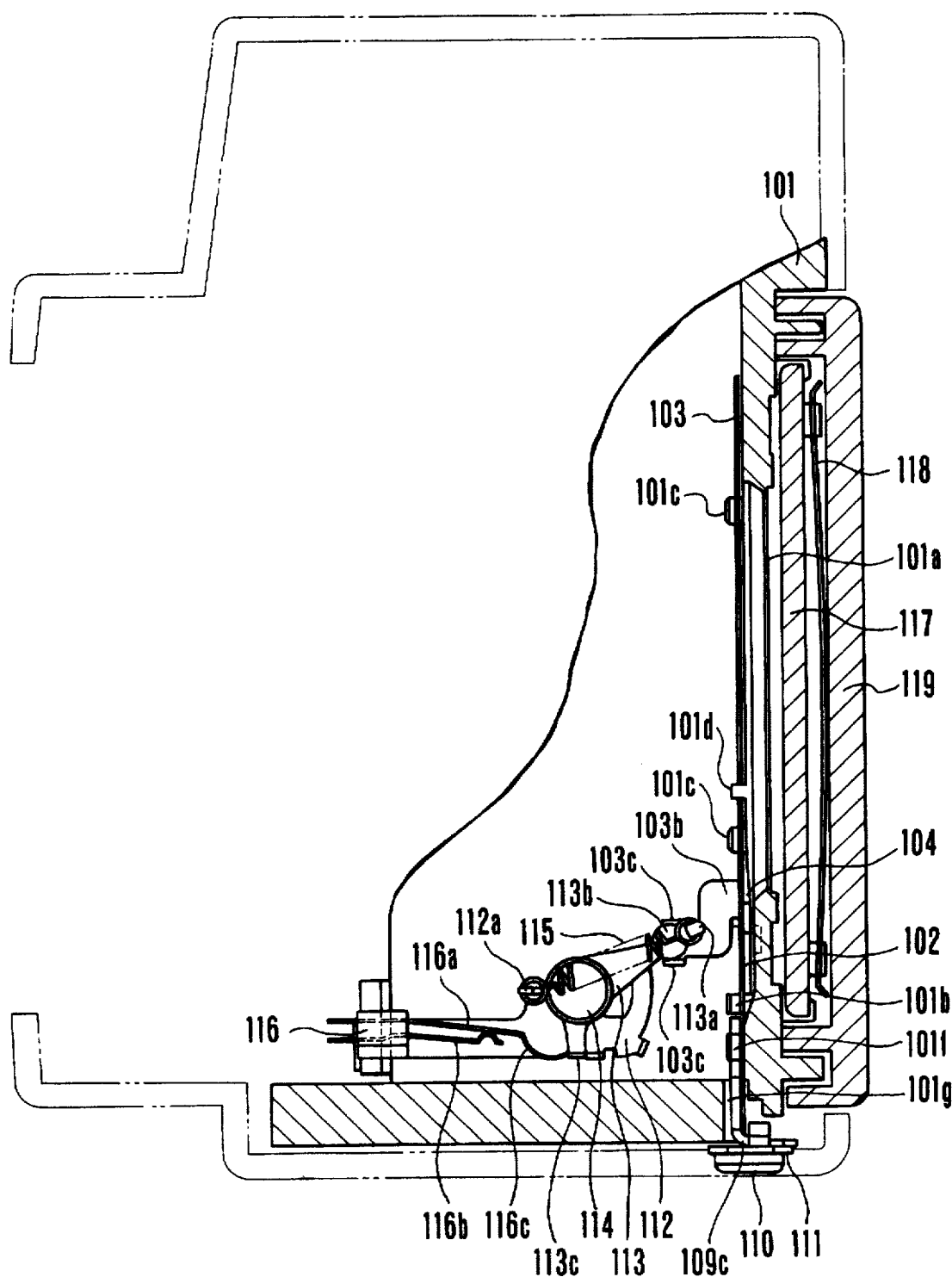
FIG. 11 is a partially omitted, vertical sectional view of the central portion of a camera according to a second embodiment of the present invention, showing a mechanism for generating a click force during a standard/panorama photography state switching operation with panorama blades being retracted from a photographic-lens optical path.
Figure 12:
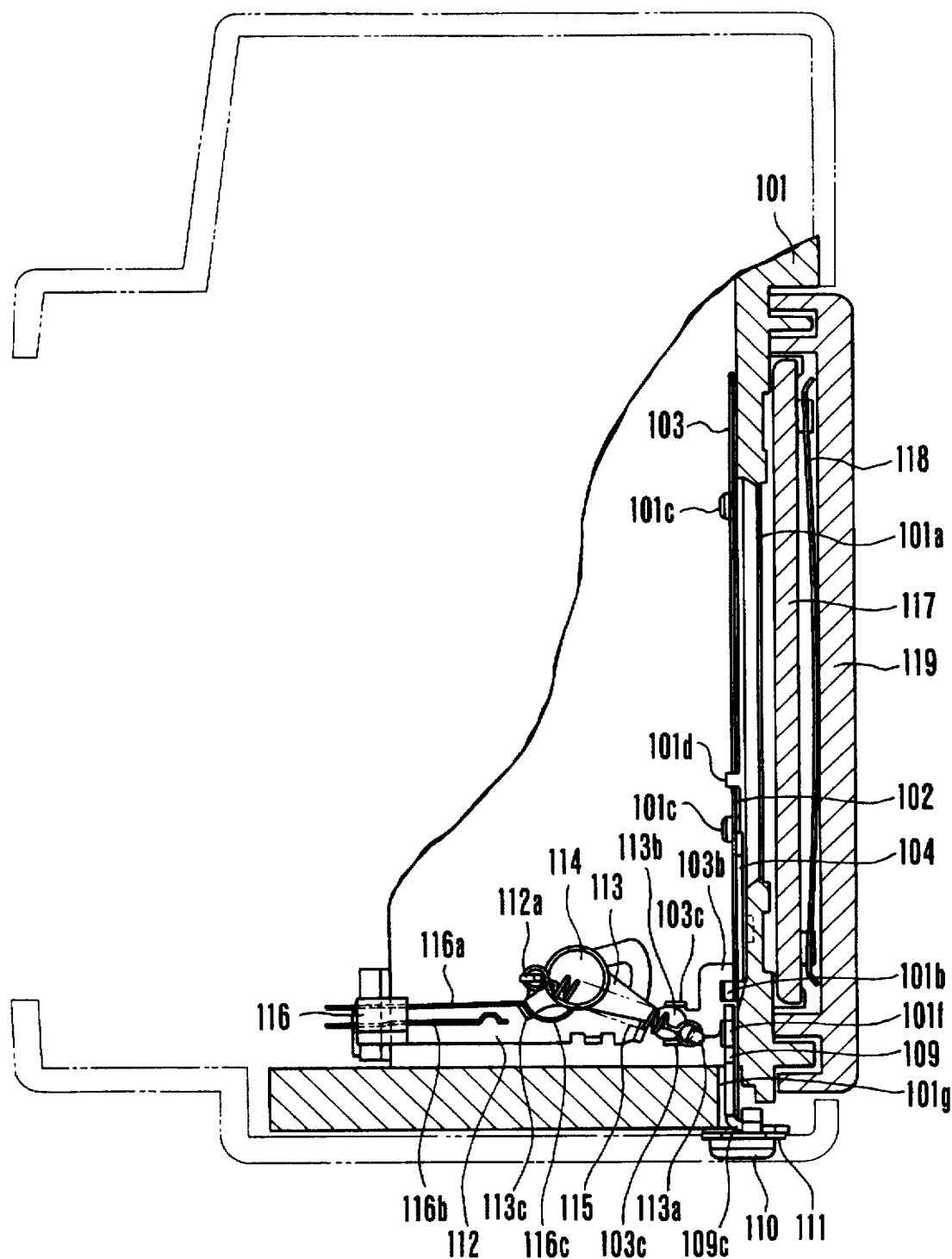
FIG. 12 is a vertical sectional view of the central portion of the camera according to the second embodiment of the present invention, showing the mechanism for generating the click force during the standard/panorama photography state switching operation with the panorama blades entering the photographic-lens optical path to block light in the upper and lower portions of an image plane.
Figure 13:
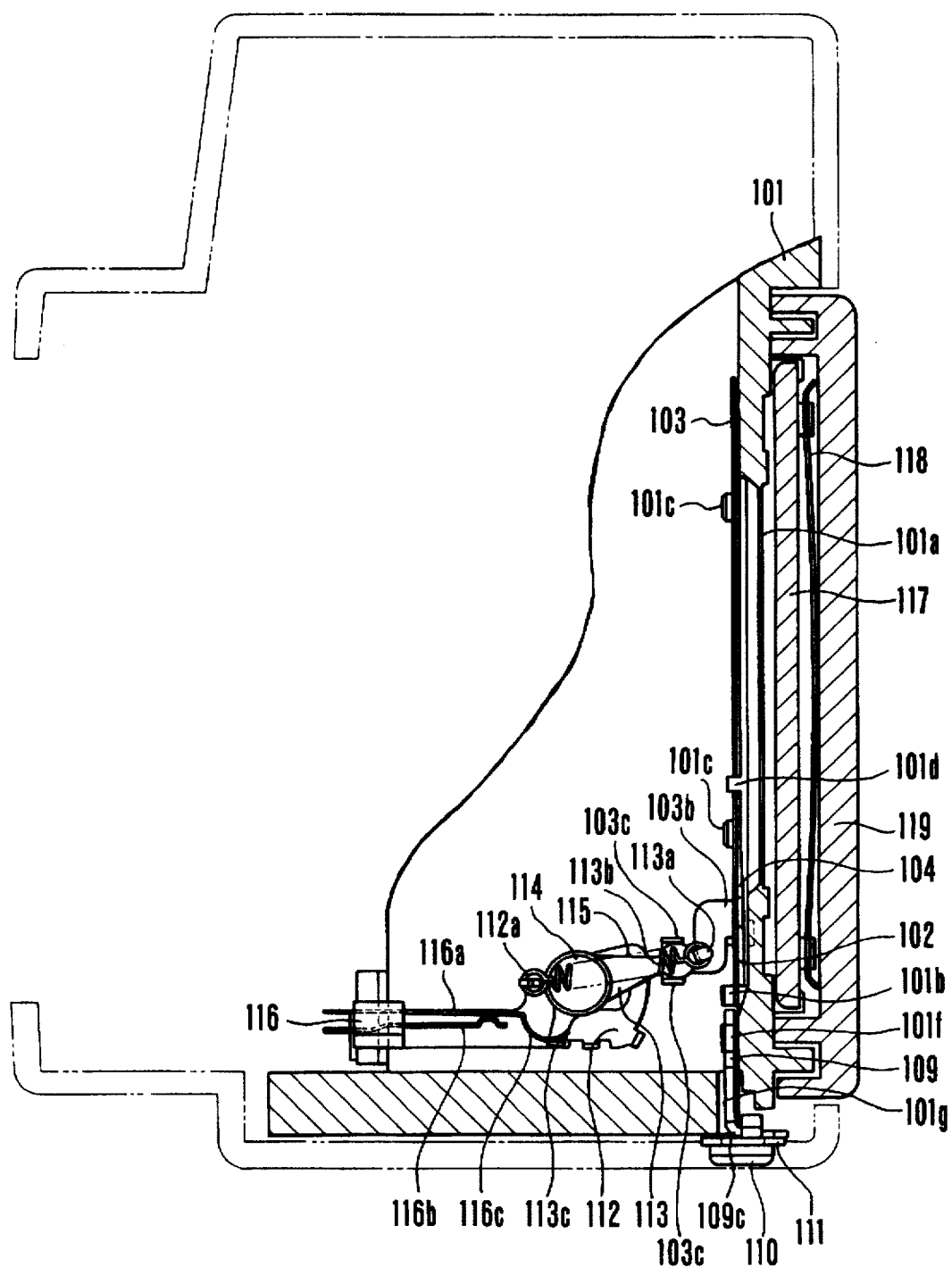
FIG. 13 is a vertical sectional view of the central portion of the camera according to the second embodiment of the present invention, showing the mechanism for generating the click force during the standard/panorama photography state switching operation with the panorama blades entering the photographic-lens optical path to slightly block light in the upper and lower portions of the image plane.

FIGS. 11 through 13 show a second embodiment of the present invention. FIG. 11 is a partially omitted, vertical sectional view of the central portion of a camera, and diagrammatically shows a mechanism for generating a click force during a standard/panorama photography state switching operation with panorama blades being retracted from a photographic-lens optical path (the standard photography state). FIG. 12 is a vertical sectional view of the central portion of the camera, and shows the mechanism for generating the click force during the standard/panorama photography state switching operation with the panorama blades entering the photographic-lens optical path to block light in the upper and lower portions of an image plane (the panorama photography state). FIG. 13 is a vertical sectional view of the central portion of the camera, and shows the mechanism for generating the click force during the standard/panorama photography state switching operation with the panorama blades being entering the photographic-lens optical path to slightly block light in the upper and lower portions of the image plane (the panorama switching halfway state). In other words, FIGS. 11, 12 and 13 respectively correspond to FIGS. 5, 6 and 8 which show the first embodiment. In FIGS. 11 through 13, constituent elements substantially identical to those used in the first embodiment are denoted by the corresponding reference numerals each of which is added to 100. The second embodiment differs from the first embodiment with regard to only a switch arrangement in which, during the standard photography state, the contact pieces of a standard/panorama detecting switch 116 are brought into contact with each other to provide electrical conduction and, during the panorama photography state, the contact pieces are separated from each other to provide electrical non-conduction. Since the operation of the second embodiment is substantially identical to that of the first embodiment, only the standard/panorama detecting switch 116 which differs from the standard/panorama detecting switch 16 will be described below and description of the other portions is omitted.

If the operation of switching the standard photography state to the panorama photography state is performed against the displacing force of the toggle action, the panorama blades 102 and 103 are rectilinearly moved while maintaining their parallel relation to block light in the upper and lower portions of the photographic image plane. When the amount of the sliding movement of each of the panorama blades 102 and 103 exceeds half of the amount required to effect switching to the panorama photography state, a force, which acts in the direction in which a toggle lever 113 is turned counterclockwise as shown in FIG. 11, that is, in the direction in which the panorama blade 103 is displaced upward, is switched to a force which acts in the direction in which the toggle lever 113 is turned clockwise as shown in FIG. 12, that is, in the direction in which the panorama blade 103 is displaced downward. Thus, the operator can obtain a distinct click touch, while the panorama blades 102 and 103 are reliably displaced to and held at their respective stoppers, thereby blocking light in the upper and lower portions of the standard photographic image plane to form the panorama image plane. At this time, contact pieces 116a and 116b of the standard/panorama detecting switch 116 are already placed into an electrically non-conductive state by an erected portion 113c of the toggle lever 113 as shown in FIG. 12, and the fact that the panorama photography state has been set is detected by the control circuit (not shown) of the camera. Similarly to the first embodiment, the "P" marks 34 and 37 which are shown in FIGS. 9 and 10 are turned on in the liquid-crystal display 31 of the back lid 19 and in the viewfinder, thereby indicating that the panorama photography mode is set.

If the panorama photography is to be cancelled to conduct photography corresponding to the standard photographic image plane, the standard/panorama switching external knob 110 which is similarly provided at the external bottom face of the camera is manually slid toward the left along the bottom of the camera against the displacing force of the toggle action. Then, operations reverse to the above-described operations are performed to reach the standard photography state. In this case as well, the operator can obtain a distinct click touch owing to the toggle action, while the panorama blades 102 and 103 are reliably displaced to and held at the positions where the panorama blades 102 and 103 are kept open. Accordingly, a proper image plane corresponding to the standard photography state, which is formed by the camera-body image plane frame 101a, is prevented from being impaired. The standard/panorama detecting switch 116 is placed into an electrically conductive state as shown in FIG. 11, and the fact that the standard photography state has been set is detected by the control circuit (not shown). Thus, the "P" marks 34 and 37 shown in FIGS. 9 and 10 are turned off to indicate that the standard photography mode is selected (the panorama photography mode is not selected).

If the standard/panorama switching external knob 110 is manually slid to the right by a small amount in the direction in which switching from the standard photography state to the panorama photography state is effected, operations similar to the above-described ones are performed and the panorama blades 102 and 103 slightly block light in the upper and lower portions of the photographic image plane as shown in FIG. 7 in a manner similar to that described above in connection with the first embodiment. At this time, as shown in FIG. 13, the toggle lever 113 has not yet reached the neutral position (the dead point) at which the toggle lever 113 does not exert an urging force on the panorama blade 103, and the force still acts in the direction in which the toggle lever 113 is turned counterclockwise, that is, in the direction in which the panorama blade 103 is displaced upward. (Accordingly, if the photographer removes his finger from the standard/panorama switching external knob 110, the panorama blades 102 and 103 are reset to the standard photography state.) Simultaneously, a large arcuate portion 116c of the extending end of the contact piece 116a is early pressed by the erected portion 113c of the toggle lever 113 to bring the contact pieces 116a and 116b of the standard/panorama detecting switch 116 out of contact with each other, whereby the contact pieces 116a and 116b are placed into an electrically non-conductive state and the fact that the panorama blades 102 and 103 block light in the upper and lower portion of the photographic image plane is detected by the circuit (not shown). Then, the "P" marks shown in FIGS. 9 and 10 are turned on to issue a warning to the photographer. It is to be noted that at the time when the standard/panorama switching external knob 110 is slid up to this position, the toggle lever 113 is still urged in the direction in which the erected portion 113c of the toggle lever 113 is pressed backward, that is, in the direction in which the toggle lever 113 is turned counterclockwise, by the large arcuate portion 116c of the extending end of the movable-side contact piece 116a of the standard/panorama detecting switch 116. Accordingly, if the photographer removes his finger from the standard/panorama switching external knob 110, the panorama blades 102 and 103 can be easily reset to the standard photography state.

If the standard/panorama switching external knob 110 is manually slid further in the direction in which panorama photography is enabled, the panorama blades 102 and 103 reach approximately middle positions of their respective predetermined strokes and are placed into the state of blocking light in the upper and lower portions of the photographic image plane by a corresponding amount. At this time, the toggle lever 113 reaches the neutral position (the dead point) at which the toggle lever 113 does not exert an urging force on the panorama blade 103, and if the finger is removed from the standard/panorama switching external knob 110, the panorama blades 102 and 103 would stop in the aforesaid state. However, since the contact pieces 116a and 116b of the standard/panorama detecting switch 116 have already been brought out of contact with each other and placed in the electrically non-conductive state, the "P" marks 34 and 37 are turned on in the liquid-crystal display 31 of the back lid 19 and in the viewfinder, thereby informing the photographer that the panorama blades 102 and 103 block light in the upper and lower portions of the photographic image plane. Accordingly, it is possible to prevent the photographer from failing in photography, for example, erroneously carrying out photography intended for the standard photography state and taking a photograph of a subject with its upper and lower portions lost.

[Third Embodiment]

Figure 14:
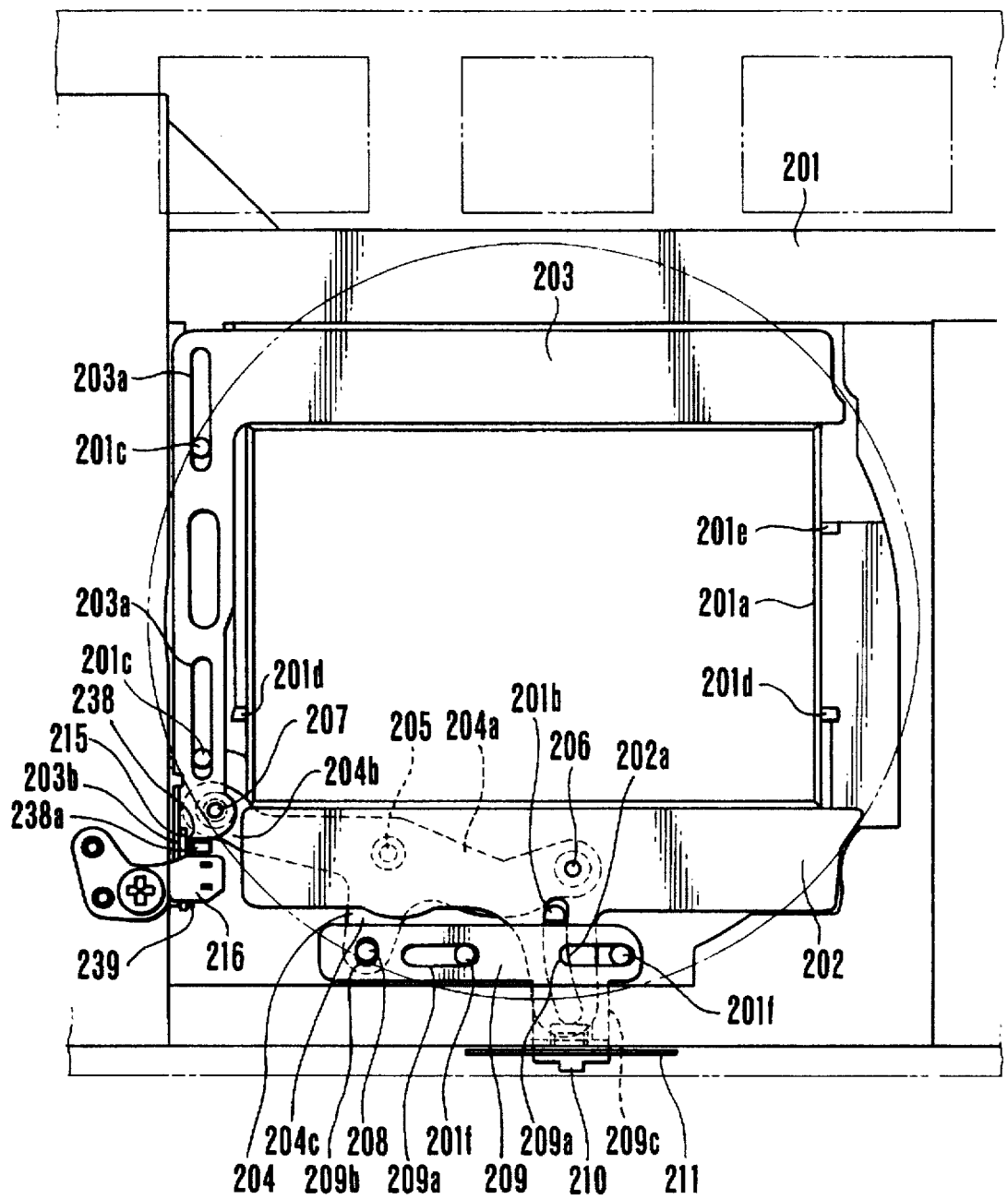
FIG. 14 is a diagrammatic, front elevational view of a camera according to a third embodiment of the present invention, showing the state in which panorama blades are retracted from a photographic-lens optical path.
Figure 15:
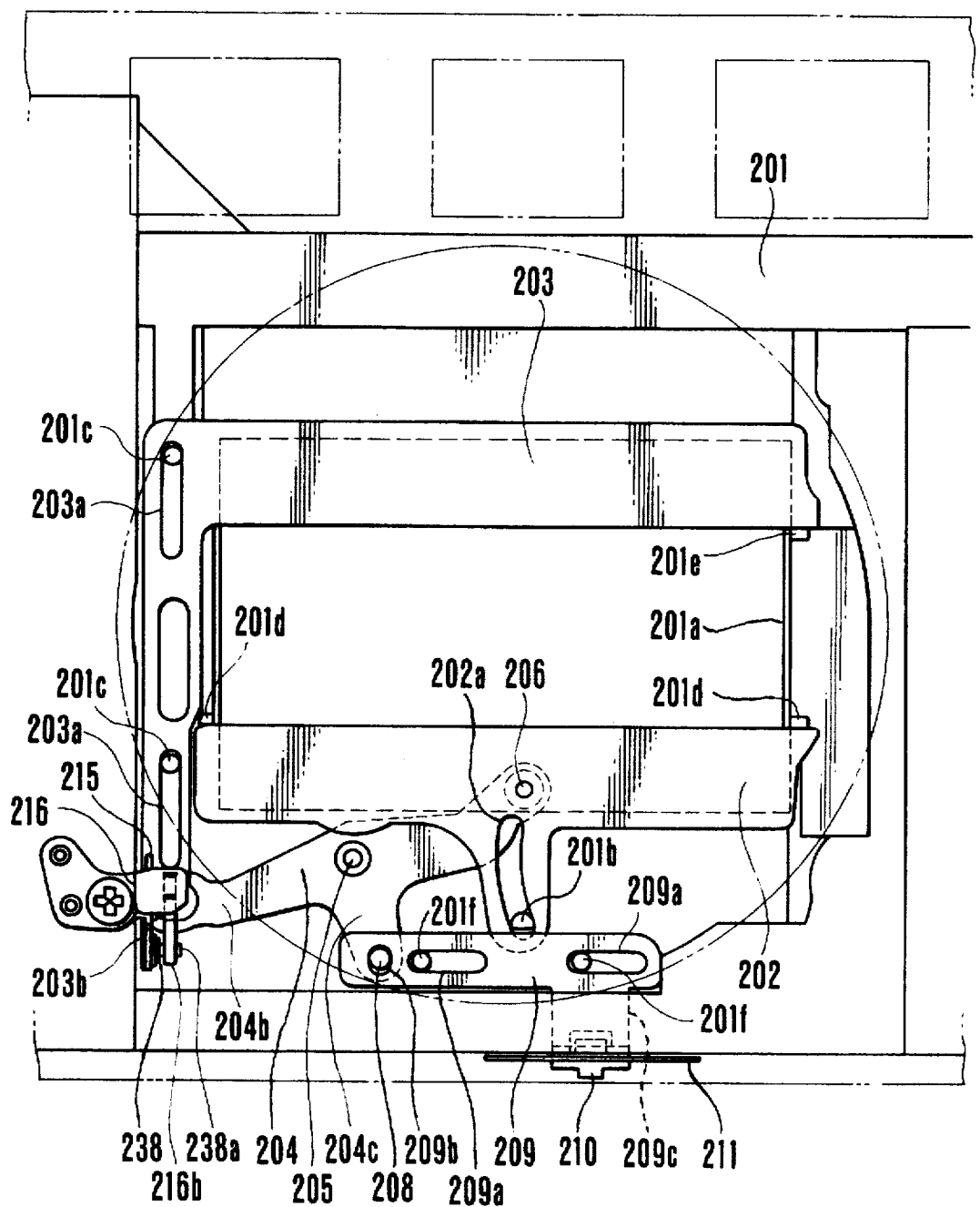
FIG. 15 is a diagrammatic, front elevational view of the camera according to the third embodiment of the present invention, showing the state in which the panorama blades have entered the photographic-lens optical path to block light in the upper and lower portion of the photographic image plane.
Figure 16:
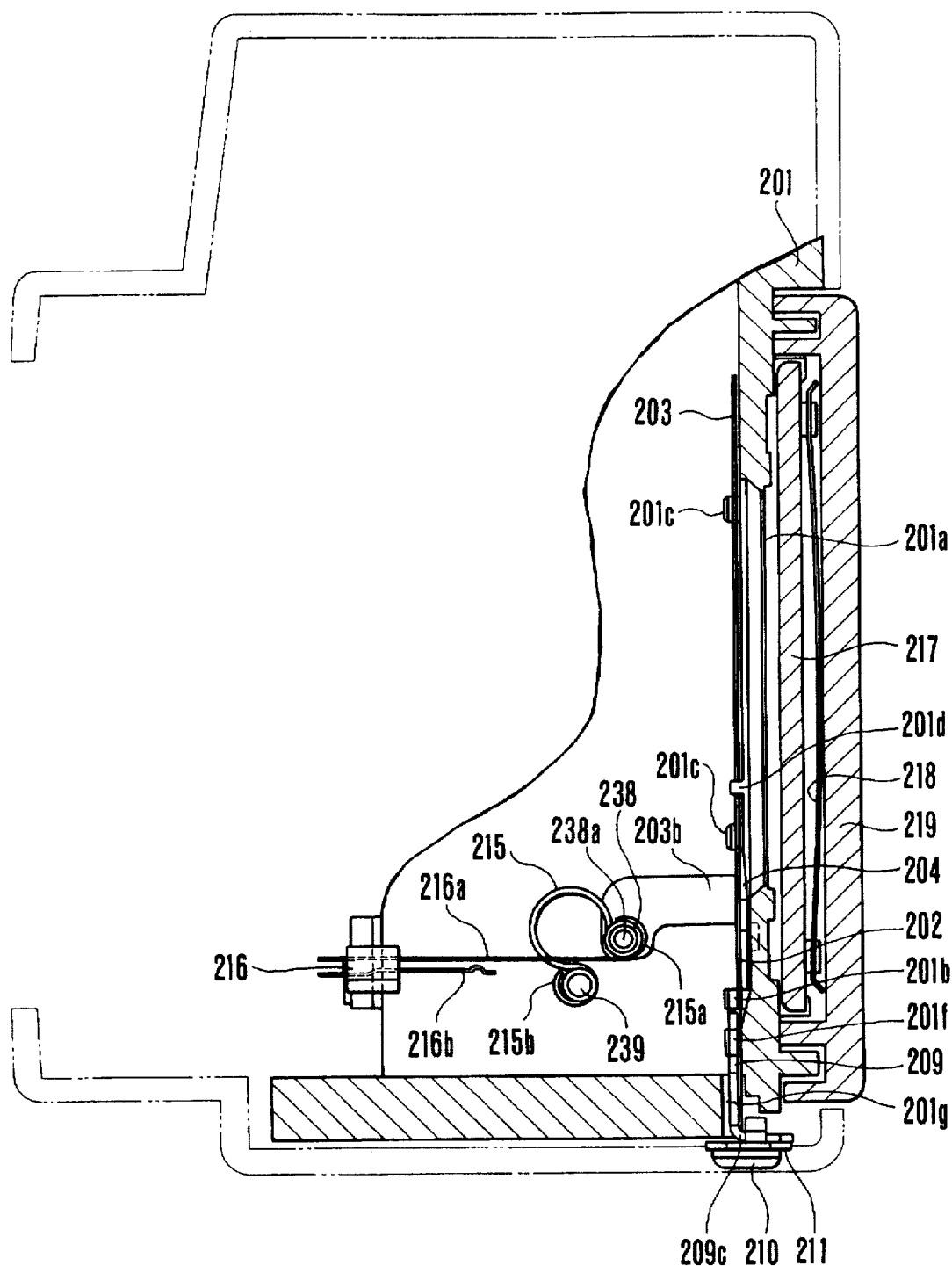
FIG. 16 is a vertical sectional view of the central portion of the camera which is placed in the state shown in FIG. 14, showing a mechanism for generating a click force during a standard/panorama photography state switching operation with a photographic lens being omitted for the sake of simplicity.
Figure 17:
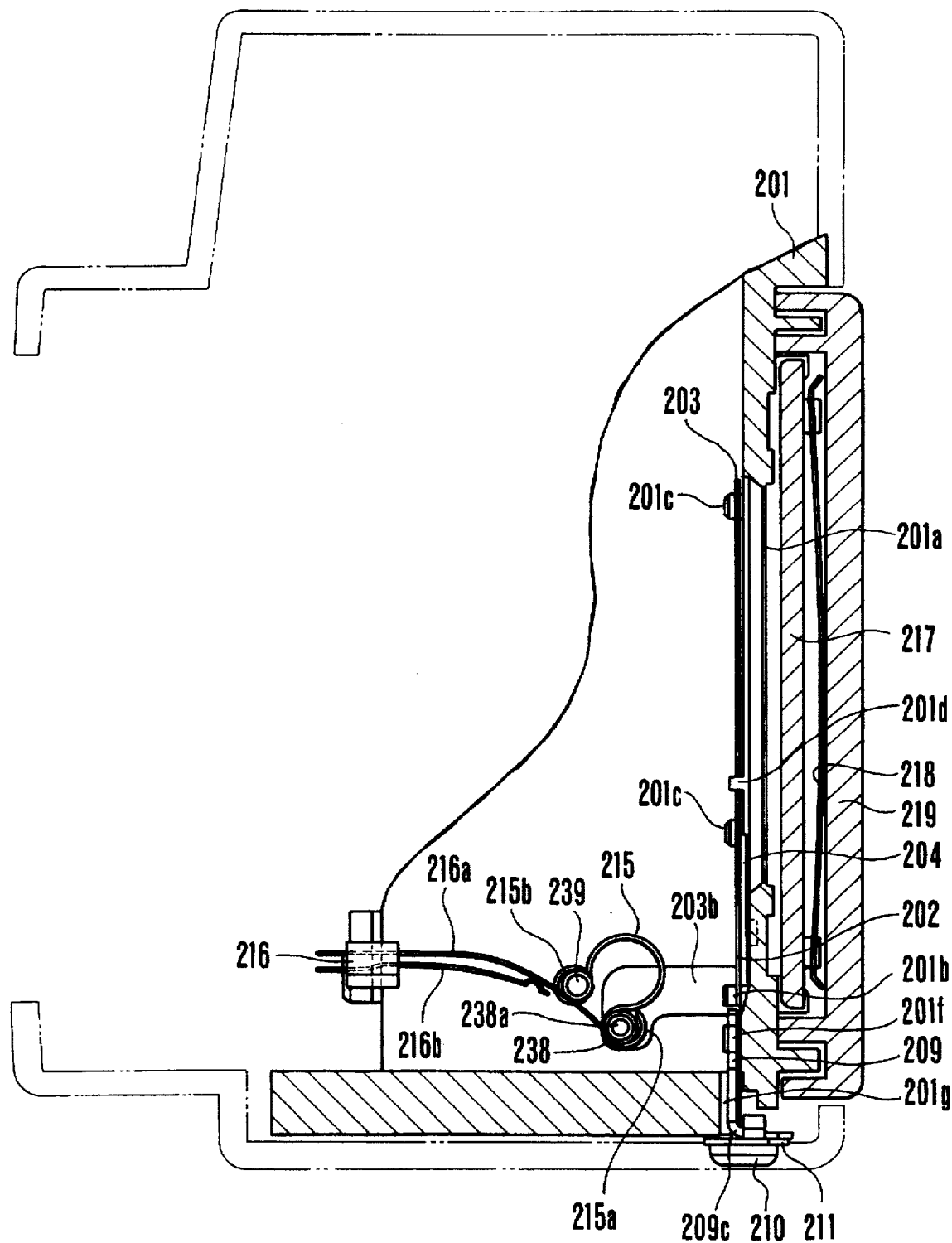
FIG. 17 is a vertical sectional view of the central portion of the camera which is placed in the state shown in FIG. 15, showing the mechanism for generating the click force during the standard/panorama photography state switching operation with the photographic lens being omitted for the sake of simplicity.
Figure 18:
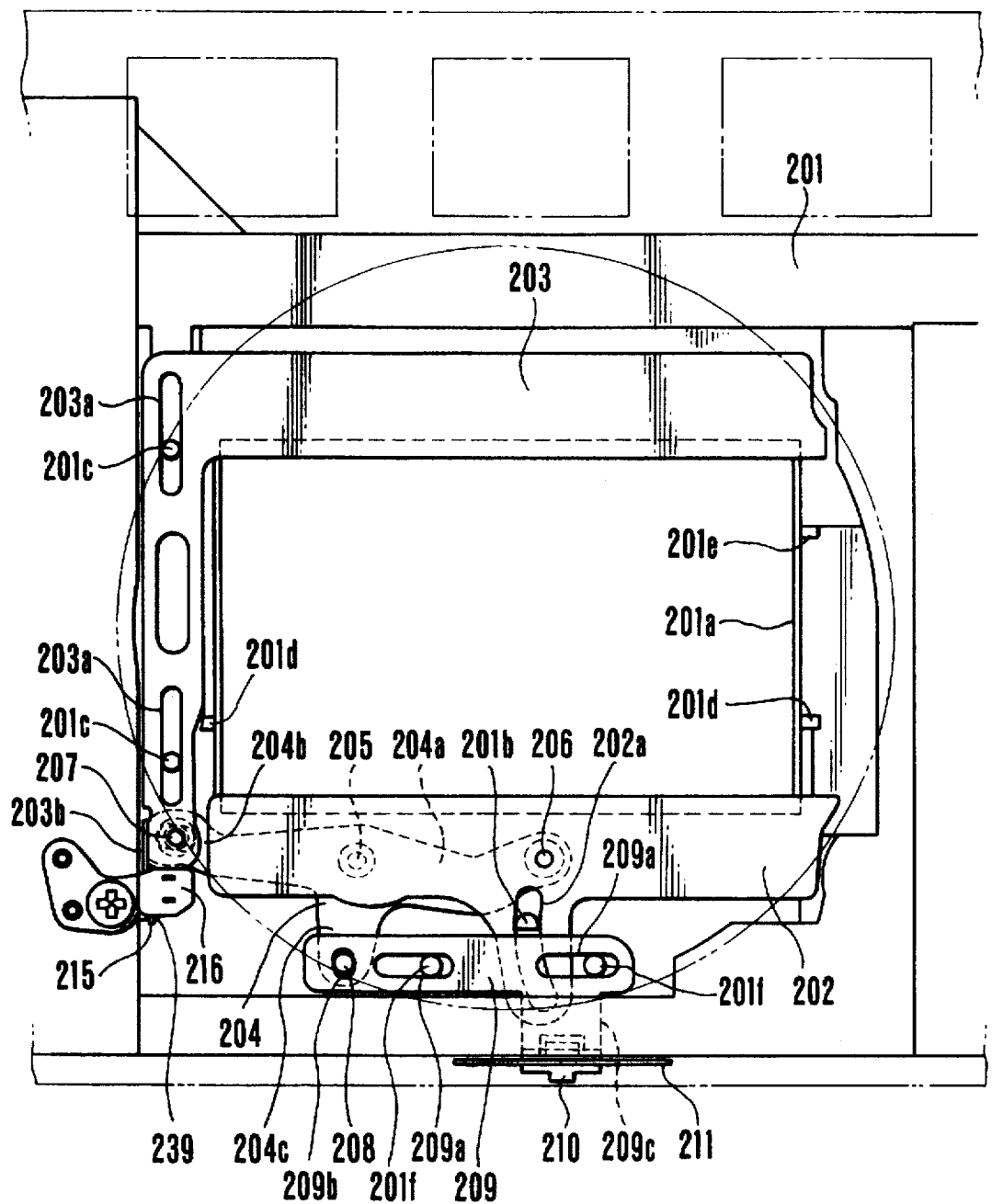
FIG. 18 is a diagrammatic, front elevational view of the essential portions of the camera according to the third embodiment of the present invention, showing the state in which the panorama blades have entered the photographic-lens optical path to slightly block light in the upper and lower portions of an image plane.
Figure 19:
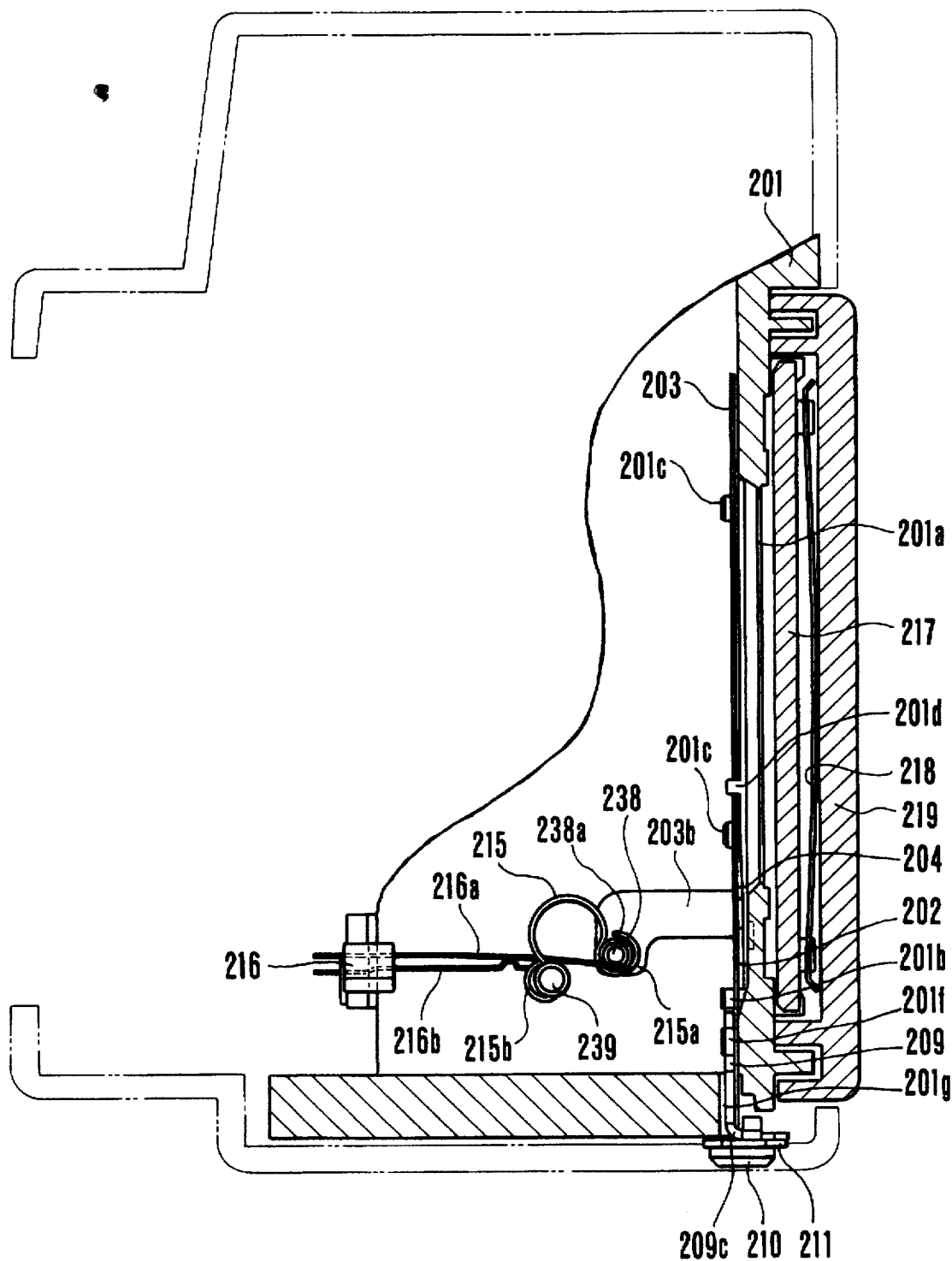
FIG. 19 is a vertical sectional view of the central portion of the camera which is placed in the state shown in FIG. 18, showing the mechanism for generating the click force during the standard/panorama photography state switching operation with the photographic lens omitted for the sake of simplicity.

FIGS. 14 through 19 show a third embodiment of the present invention. FIG. 14 is a diagrammatic, front elevational view of a camera, and shows the state in which panorama blades are retracted from a photographic-lens optical path (the standard photography state). FIG. 15 is a diagrammatic, front elevational view of the camera, and shows the state in which the panorama blades have entered the photographic-lens optical path to block light in the upper and lower portion of the photographic image plane (the panorama photography state). FIG. 16 is a vertical sectional view of the central portion of the camera which is placed in the state shown in FIG. 14, and shows a mechanism for generating a click force during a standard/panorama photography state switching operation with a photographic lens being omitted for the sake of simplicity. FIG. 17 is a vertical sectional view of the central portion of the camera which is placed in the state shown in FIG. 15, and shows the mechanism for generating the click force during the standard/panorama photography state switching operation with the photographic lens being omitted for the sake of simplicity. FIG. 18 is a diagrammatic, front elevational view of the essential portions of the camera, and shows the state (panorama switching halfway state) in which the panorama blades are made to enter the photographic-lens optical path and slightly block light in the upper and lower portions of an image plane. FIG. 19 is a vertical sectional view of the central portion of the camera which is placed in the state shown in FIG. 18, and shows the mechanism for generating the click force during the standard/panorama photography state switching operation with the photographic lens omitted for the sake of simplicity. In FIGS. 14 through 19, constituent elements substantially identical to those used in the first embodiment are denoted by the corresponding reference numerals each of which is added to 200. The third embodiment differs from the first embodiment with regard to only the mechanism for generating the click force during the standard/panorama state switching operation and the arrangement of a standard/panorama detecting switch, and the following description refers to only portions associated therewith. A toggle spring 215 has an Ω-like shape with both arms curved inward, and an arm 215a is rotatably held by a pin 238 provided on an erected portion 203b of a panorama blade 203, while an arm 215b is rotatably held by a pin 239 provided a camera body 201. Accordingly, the toggle spring 215 generates a force which causes the arms 215a and 215b to open outward at all times, and imparts to the panorama blade 203 via the pin 238 a unidirectional urging force which switches according to the rotational position of the toggle spring 215 (a so-called toggle action). A standard/panorama detecting switch 216 includes two contact pieces 216a and 216b. When the extending end of the contact piece 216a is pressed by an erected portion 238a provided on the pin 238, a projection of the contact piece 216b and the contact piece 216a are brought into contact with each other to provide electrical conduction, whereby it is detected whether the panorama photography state is set.

If the operation of switching the standard photography state to the panorama photography state is performed against the displacing force of the toggle action, the panorama blades 202 and 203 are rectilinearly moved while maintaining their parallel relation to block light in the upper and lower portions of the photographic image plane. When the amount of the sliding movement of each of the panorama blades 202 and 203 exceeds half of the amount required to effect switching to the panorama photography state, a force, which acts in the direction in which the panorama blade 203 is displaced upward by the toggle spring 215 as shown in FIG. 16, is switched to a force which acts in the direction in which the panorama blade 203 is displaced downward by the toggle spring 215 as shown in FIG. 17. Thus, the operator can obtain a distinct click touch, while the panorama blades 202 and 203 are reliably displaced to and held at the positions where the respective end faces of the panorama blades 202 and 203 are brought into contact with the panorama blade stoppers 201d and 201e, thereby blocking light in the upper and lower portions of the photographic image plane to form the panorama image plane. At this time, the contact pieces 216a and 216b of the standard/panorama detecting switch 216 are already placed into an electrically conductive state by a projection 238a provided on the pin 238 as shown in FIG. 17, and the fact that the panorama photography state has been set is detected by the control circuit (not shown). Similarly to the first embodiment, the "P" marks 34 and 37 which are shown in FIGS. 9 and 10 are turned on in the liquid-crystal display 31 of the back lid 19 and in the viewfinder, thereby indicating that the panorama photography mode is set.

If the panorama photography is to be cancelled to conduct photography corresponding to the standard photographic image plane, a standard/panorama switching external knob 210 which is similarly provided at the external bottom face of the camera is manually slid toward the left along the bottom of the camera against the displacing force of the toggle action. Then, operations reverse to the above-described operations are performed to reach the state shown in FIG. 14. In this case as well, the operator can obtain a distinct click touch owing to the toggle action, while the panorama blades 202 and 203 are reliably displaced to and held at the positions where the panorama blades 202 and 203 are kept open. Accordingly, a proper image plane corresponding to the standard photography state, which is formed by a camera-body image plane frame 201a, is prevented from being impaired. The standard/panorama detecting switch 216 is placed into an electrically non-conductive state as shown in FIG. 16, and the fact that the standard photography state has been set is detected by the control circuit (not shown). Thus, the "P" marks 34 and 37 shown in FIGS. 9 and 10 are turned off to indicate that the standard photography mode is selected (the panorama photography mode is not selected).

If the standard/panorama switching external knob 210 is manually slid to the right by a small amount in the direction in which switching from the standard photography state to the panorama photography state is effected, operations similar to the above-described ones are performed and the panorama blades 202 and 203 are placed into the state of slightly blocking light in the upper and lower portions of the photographic image plane as shown in FIG. 18. At this time, as shown in FIG. 19, the toggle spring 215 has not yet reached the neutral position (the dead point) at which the toggle spring 215 does not exert an urging force on the panorama blade 203, and the force still acts in the direction in which the panorama blade 203 is displaced upward.

(Accordingly, if the photographer removes his finger from the standard/panorama switching external knob 210, the panorama blades 202 and 203 are reset to the standard photography state.) Simultaneously, the extending end of the contact piece 216a is early pressed by the projection 238a provided on the pin 238, whereby the contact pieces 216a and 216b are placed into an electrically conductive state and the fact that the panorama blades 202 and 203 block light in the upper and lower portion of the photographic image plane is detected by the circuit (not shown). Then, the "P" marks 34 and 37 shown in FIGS. 9 and 10 are turned on to issue a warning to the photographer. It is to be noted that at the time when the standard/panorama switching external knob 210 is slid up to this position, the projection 238a provided on the pin 238 is still urged in the direction in which it is pressed back upward, by the extending end of the movable-side contact piece 216a of the standard/panorama detecting switch 216. Accordingly, if the photographer removes his finger from the standard/panorama switching external knob 210, the panorama blades 202 and 203 can be easily reset to the standard photography state.

If the standard/panorama switching external knob 210 is manually slid further in the direction in which panorama photography is enabled, the panorama blades 202 and 203 reach approximately middle positions of their respective predetermined strokes and are placed into the state of blocking light in the upper and lower portions of the photographic image plane by a corresponding amount. At this time, the toggle spring 215 reaches the neutral position (the dead point) at which the toggle spring 215 does not exert an urging force on the panorama blade 203, and if the finger is removed from the standard/panorama switching external knob 210, the panorama blades 202 and 203 would stop in the aforesaid state. However, since the contact pieces 216a and 216b of the standard/panorama detecting switch 216 have already been brought into contact with each other and placed in the electrically conductive state, the "P" marks 34 and 37 are turned on in the liquid-crystal display 31 of the back lid 19 and in the viewfinder, thereby informing the photographer that the panorama blades 202 and 203 block light in the upper and lower portions of the photographic image plane. Accordingly, it is possible to prevent the photographer from failing in photography, for example, erroneously carrying out photography intended for the standard photography state and taking a photograph of a subject with its upper and lower portions lost.

As compared to the first embodiment, the third embodiment does not need a toggle lever and other associated parts. Accordingly, since it is possible to directly obtain a toggle action from the shape of the toggle spring, a very simple structure can be adopted and the required space can be reduced. Accordingly, the third embodiment is suited to miniaturization of cameras and provides large economic merits.

As described above, according to the first to third embodiments of the present invention, in a camera which is provided with light blocking means for forming a new photographic image plane frame by retractably entering a photographic image plane frame and blocking light in part of the photographic image plane frame in response to a switching operation, there are provided switching means which switches its state at a point in the first half of a stroke through which the light blocking means moves from its maximum retracted position to its maximum advanced position and display means for providing a visual display according to the state of the switching means. Accordingly, even if panorama blades stop at a halfway position to block light halfway in part of the photographic image plane, it is possible to issue a warning to a photographer.

Also, in an arrangement in which an urging force is imparted to the light blocking means by a toggle spring mechanism, there is provided switching means which switches its state at a point in a process in which the light blocking means moves from the maximum retracted position to a position where the urging force due to the toggle spring mechanism is reversed. Accordingly, even if the urging force due to the toggle spring mechanism does not work and the light blocking means stops at a dead point, it is possible to display a warning indicating that light is blocked in part of the photographic image plane. Accordingly, it is possible to remarkably reduce the probability that the photographer erroneously carries out photography intended for the standard photography state and takes a failed photograph in which a subject is photographed with its upper and lower portions lost.

[Fourth Embodiment]

Figure 20:
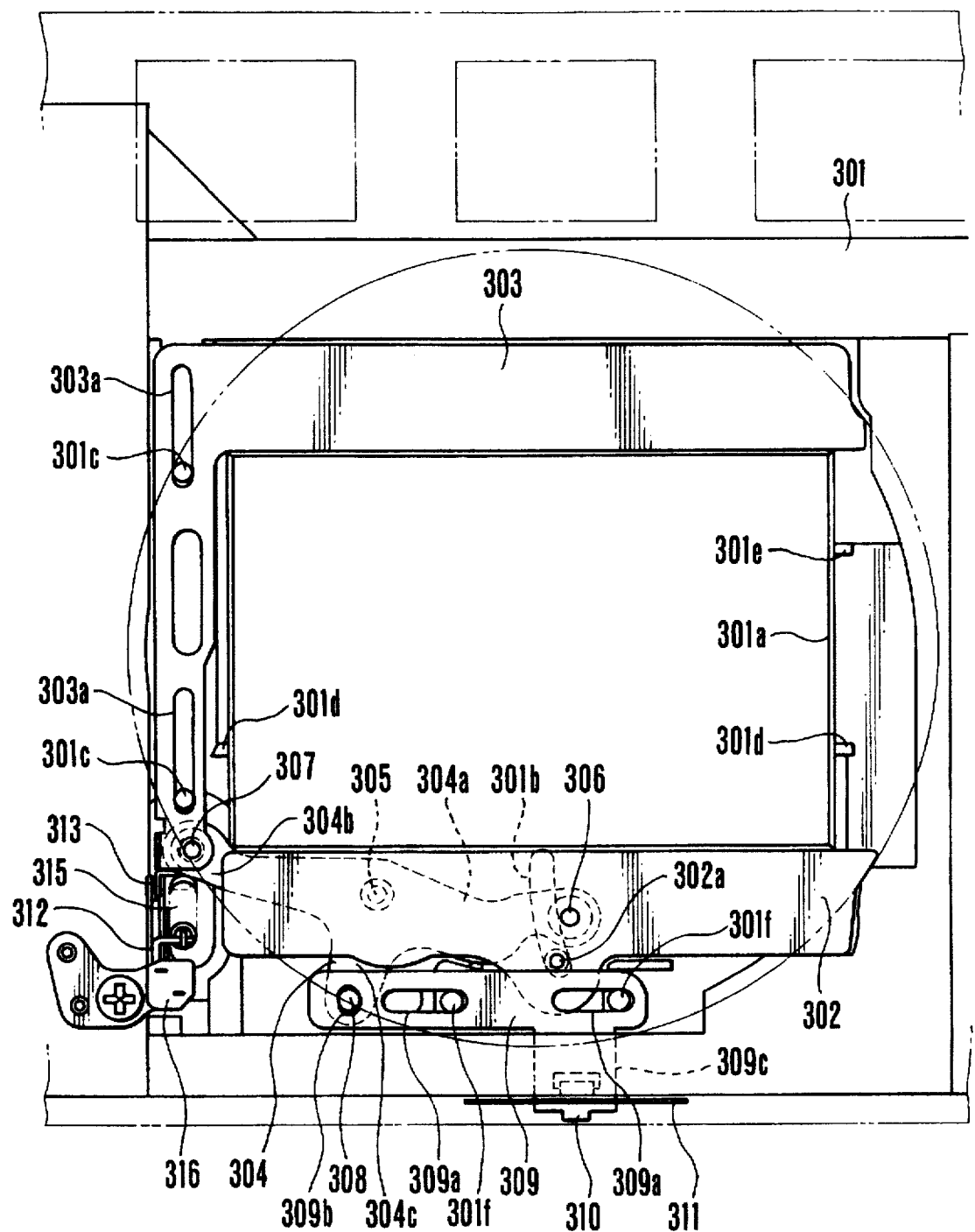
FIG. 20 is a diagrammatic, front elevational view of the arrangement of the essential portions of a camera according to a fourth embodiment of the present invention, and shows the standard photography state in which panorama blades are retracted from a photographic-lens optical path.
Figure 21:
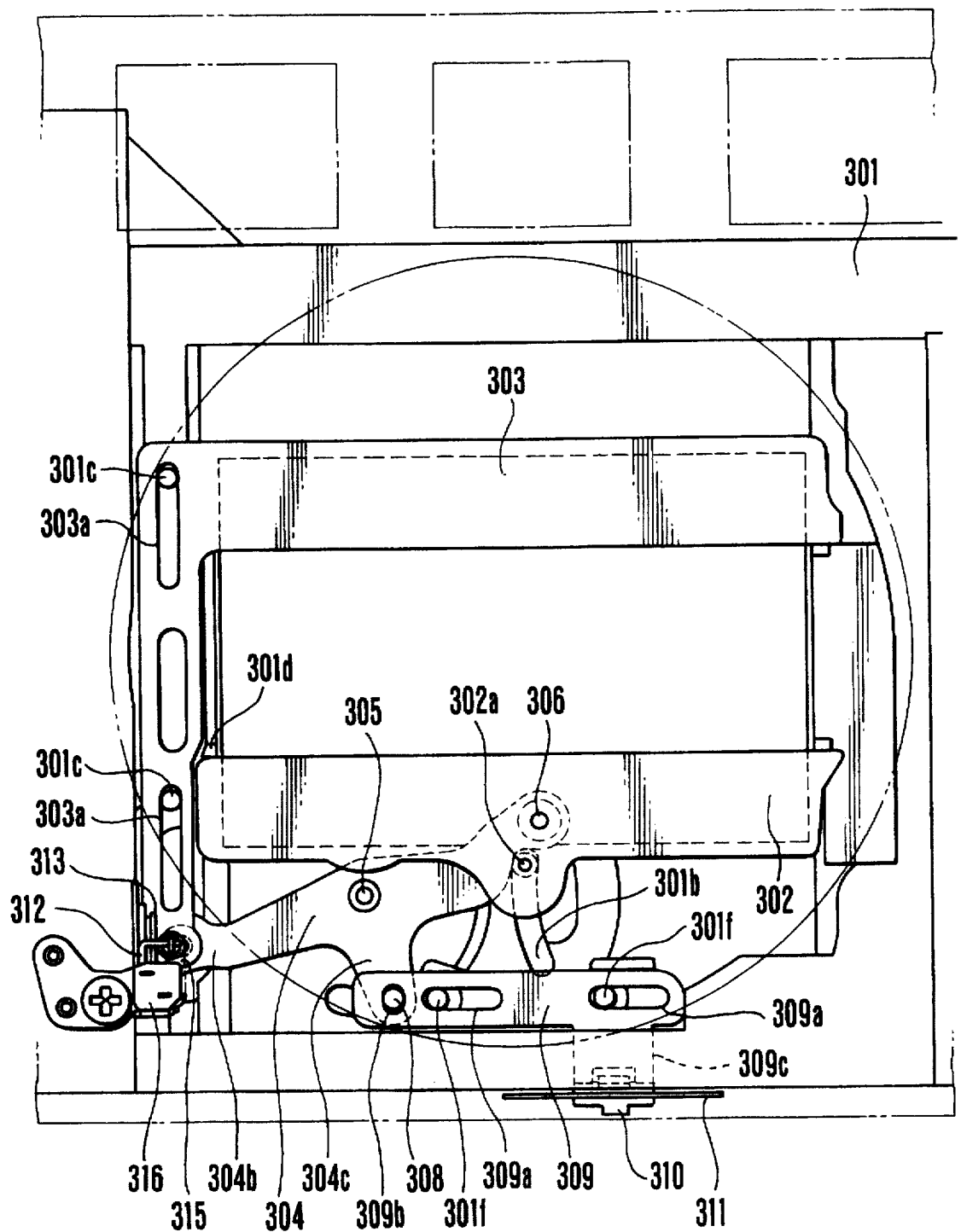
FIG. 21 is a diagrammatic, front elevational view of the arrangement of the essential portions of the camera according to the fourth embodiment of the present invention, showing the panorama photography state in which the panorama blades have entered the photographic-lens optical path to block light in the upper and lower portions of an image plane.

FIGS. 20 and 21 show a fourth embodiment of the present invention. FIG. 20 is a diagrammatic, front elevational view of the arrangement of the essential portions of a camera, and shows the state (standard photography state) in which panorama blades are retracted from a photographic-lens optical path. FIG. 21 is a diagrammatic, front elevational view of the arrangement of the essential portions of the camera, and shows the state (panorama photography state) in which the panorama blades have entered the photographic-lens optical path to block light in the upper and lower portions of an image plane.

In FIGS. 20 and 21, constituent elements substantially identical to those used in the first embodiment are denoted by the corresponding reference numerals each of which is added to 300. The fourth embodiment differs from the first embodiment only in that a camera body 301 is provided with a rotation limiting guide groove 301b of arcuate shape for causing a panorama blade 302 to move in parallel relation to a panorama blade 303 and the panorama blade 302 is provided with a panorama blade guide pin 302a engaged with the rotation limiting guide groove 301b. In other words, the relationship between the corresponding guide groove and guide pin is reversed, and the other constituent elements are substantially identical to those used in the first embodiment.

An operation for effecting switching from the standard image plane frame to the panorama image plane frame and an operation for effecting switching from the panorama image plane frame to the standard image plane frame are identical to those explained in connection with the first embodiment, and description thereof is omitted.

It is to be noted that the above-described panorama mechanism may be constructed as a structure which can be handled as one unit. In the structure, a base plate (not shown) is provided in the space between the camera body 301 and the panorama blades 302 and 303, and the rotation limiting guide groove 301b, panorama blade guide pins 301c, panorama blade stoppers 301d and 301e, the panorama lever guide pins 301f and other associated parts are provided on the base plate. After the required parts have been mounted on the base plate, the base plate is fixed to the camera body 301.

[Fifth Embodiment]

Figure 22:
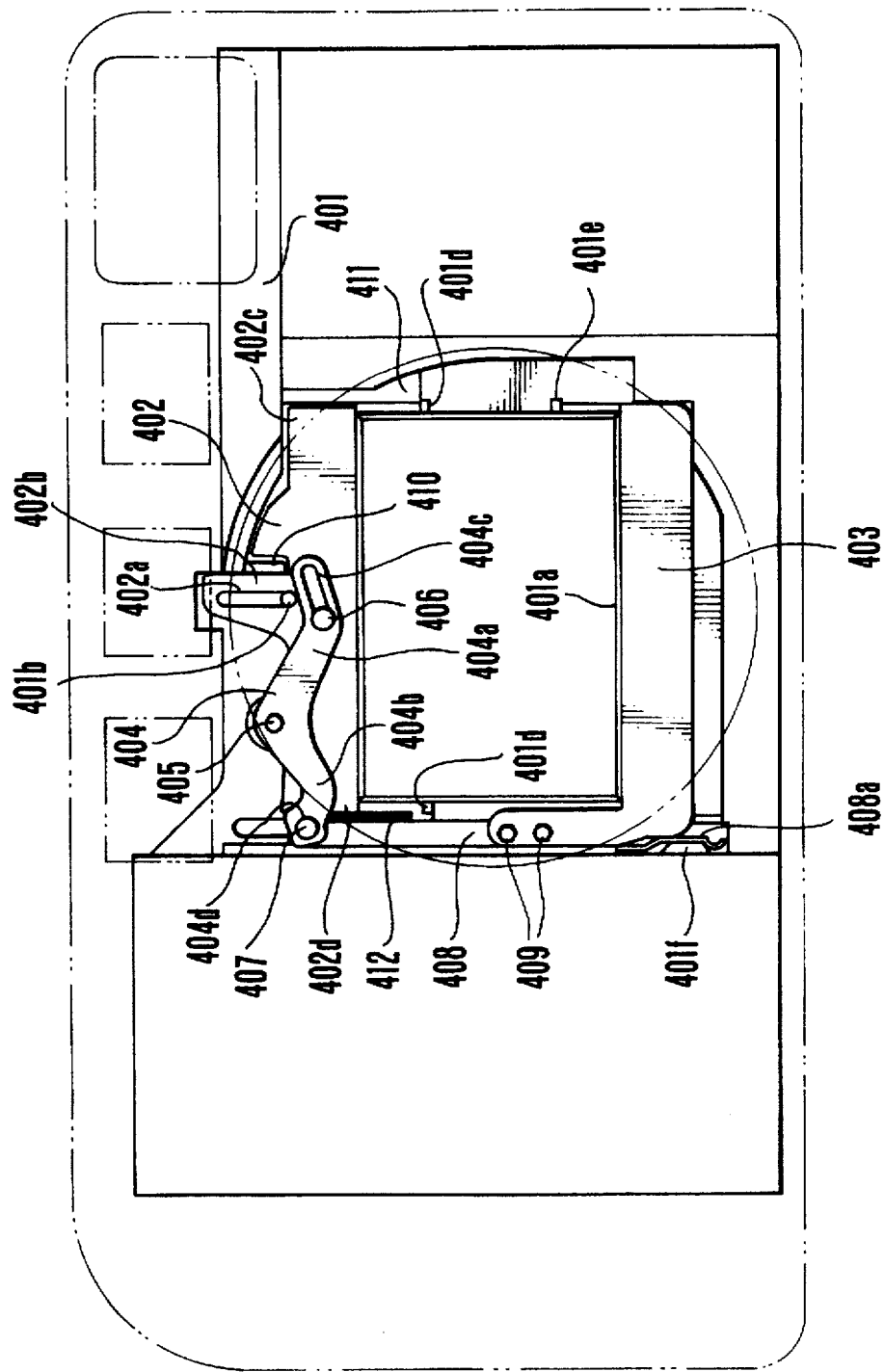
FIG. 22 is a diagrammatic, front elevational view of the arrangement of the essential portions of a camera according to a fifth embodiment of the present invention, showing the standard photography state in which panorama blades are retracted from a photographic-lens optical path.
Figure 23:
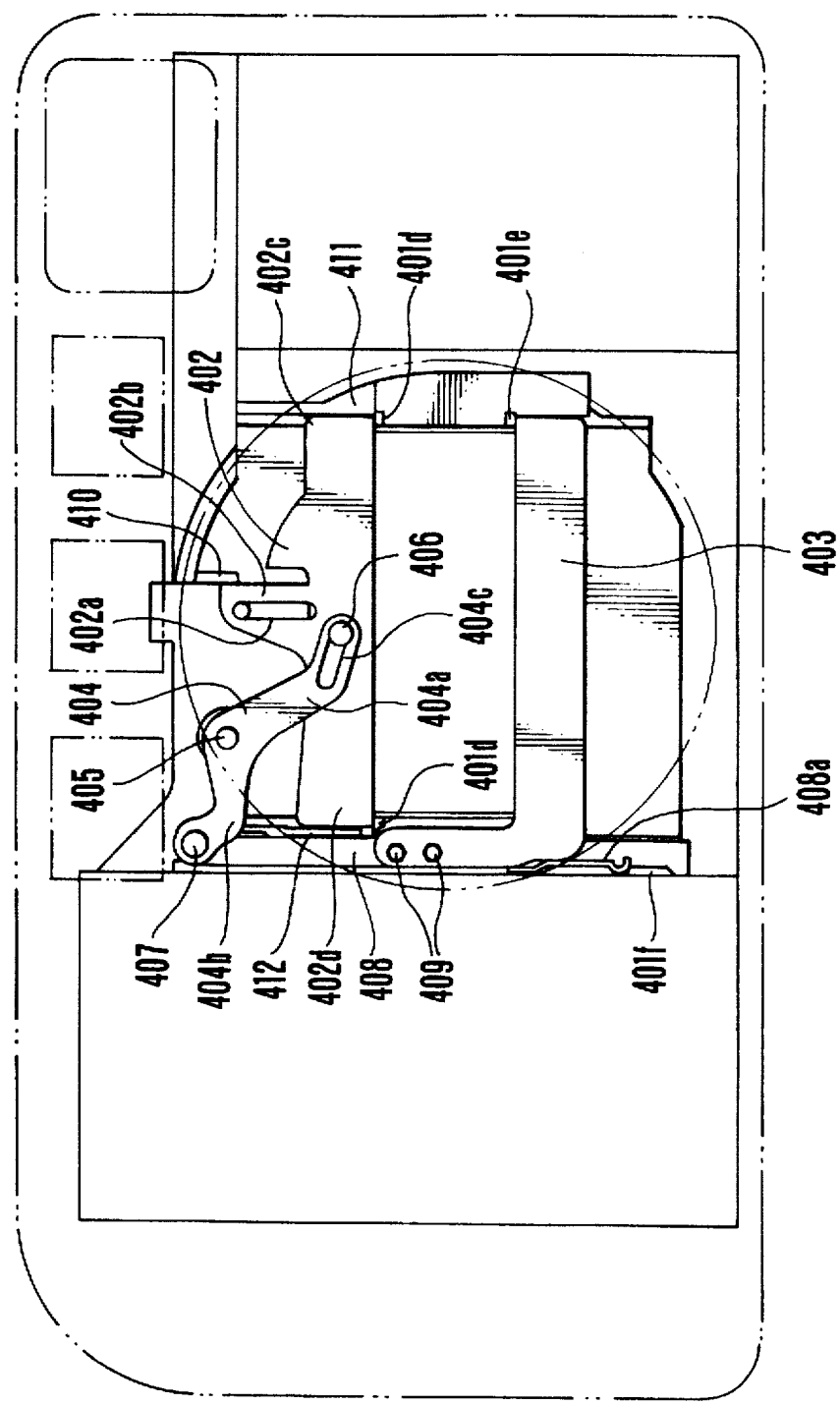
FIG. 23 is a diagrammatic, front elevational view of the arrangement of the essential portions of the camera according to the fifth embodiment of the present invention, showing the panorama photography state in which the panorama blades have entered the photographic-lens optical path to block light in the upper and lower portions of an image plane.

FIGS. 22 and 23 show a fifth embodiment of the present invention. FIG. 22 is a diagrammatic, front elevational view of the arrangement of the essential portions of a camera, and shows the state (standard photography state) in which panorama blades are retracted from a photographic-lens optical path. FIG. 23 is a diagrammatic, front elevational view of the arrangement of the essential portions of the camera, and shows the state (panorama photography state) in which the panorama blades have entered the photographic-lens optical path to block light in the upper and lower portions of an image plane.

In FIGS. 22 and 23, the shown example includes a camera body 401, a camera-body image plane frame 401a, a panorama blade guide pin 401b provided on the camera body 401, panorama blade stoppers 401d and 401e formed on the camera body 401.

Figure 31:
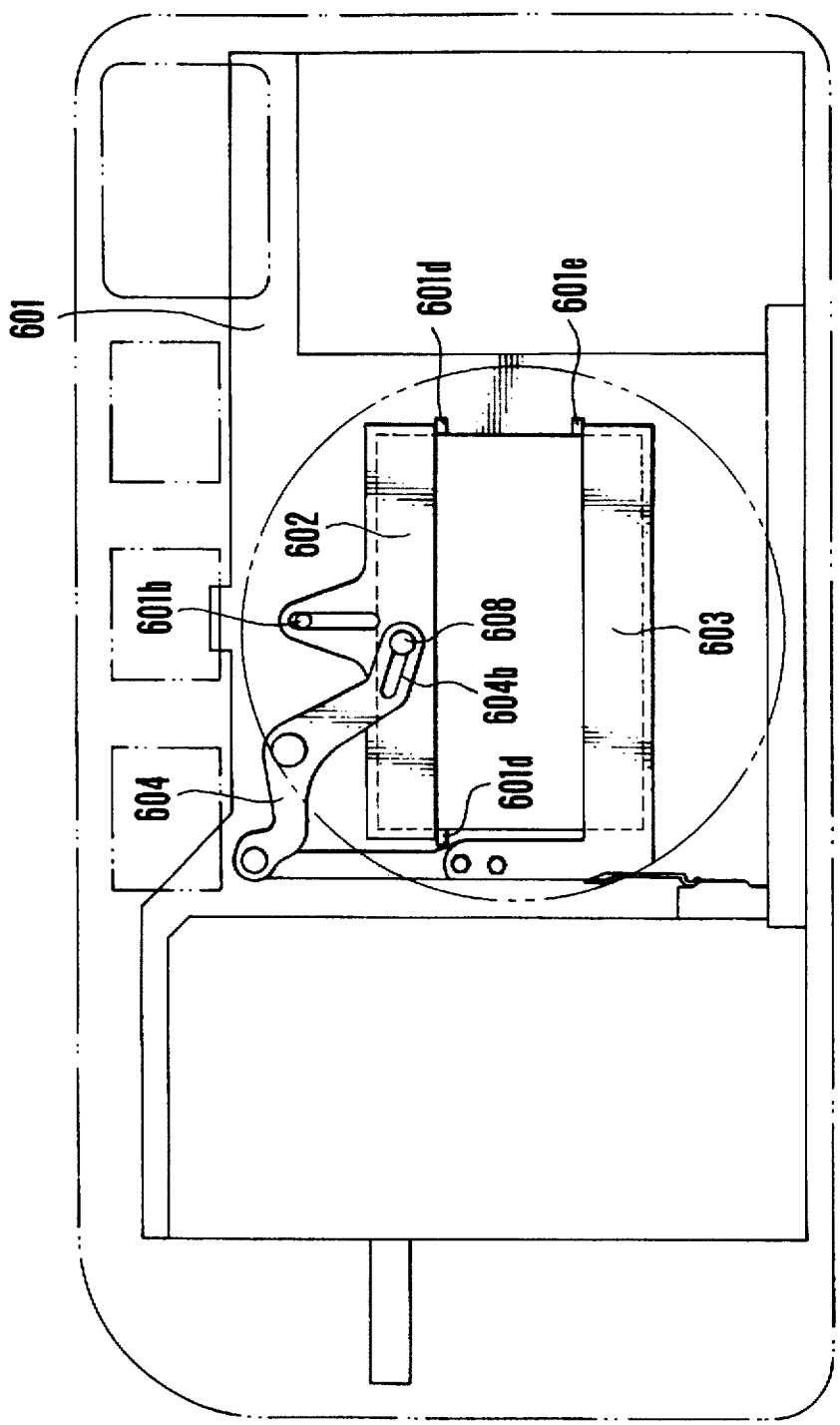
FIG. 31 is a diagrammatic, front elevational view of the arrangement of the essential portions of a camera which is proposed as a second example in Japanese Patent Application No. Hei 4-3186, showing the panorama photography state in which panorama blades have entered the photographic-lens optical path to block light in the upper and lower portions of an image plane.
Figure 32:
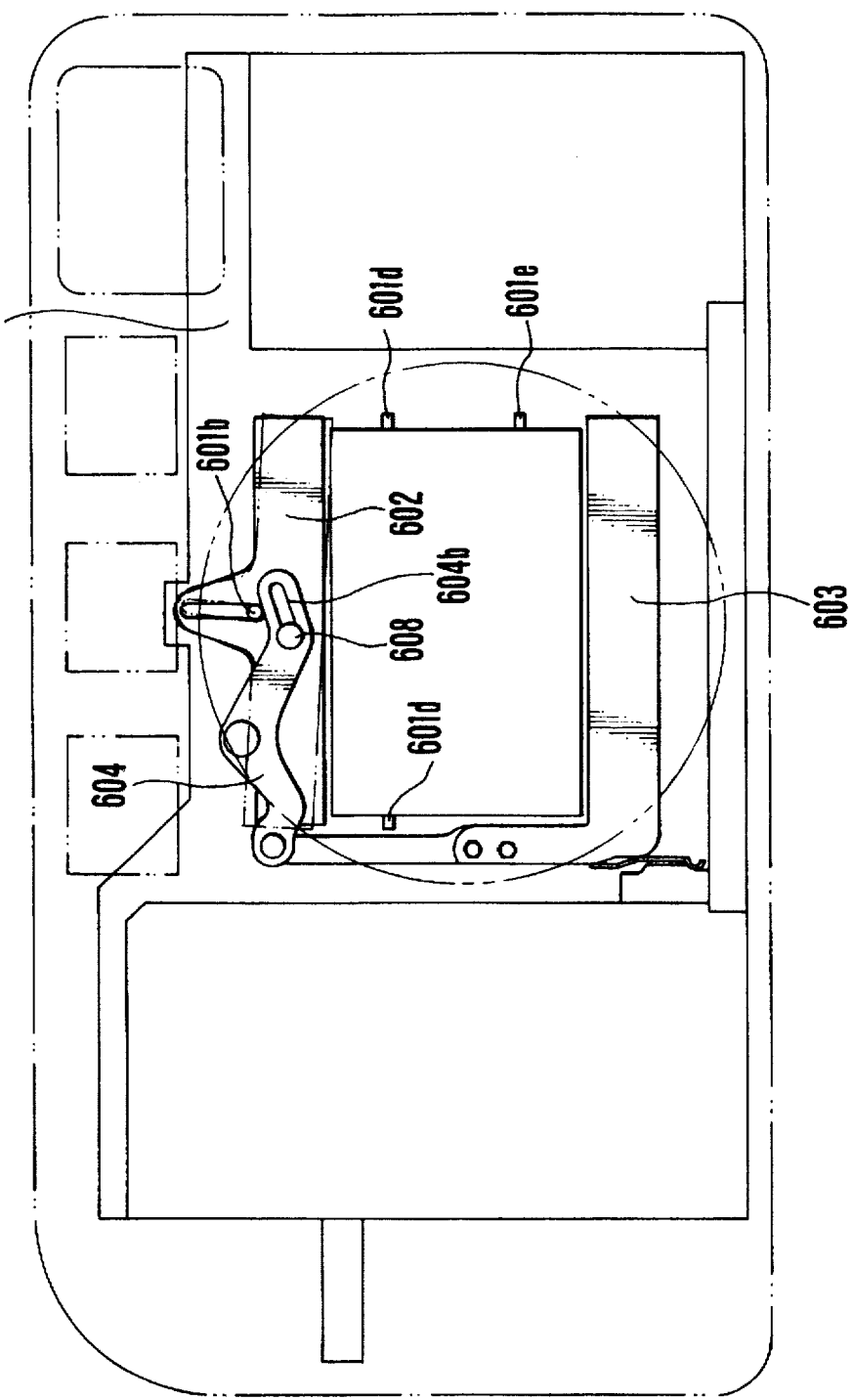
FIG. 32 is a diagrammatic, front elevational view of the arrangement of the essential portions of the camera of FIG. 31, showing the standard photography state in which the panorama blades are retracted from the photographic-lens optical path.
Figure 33:
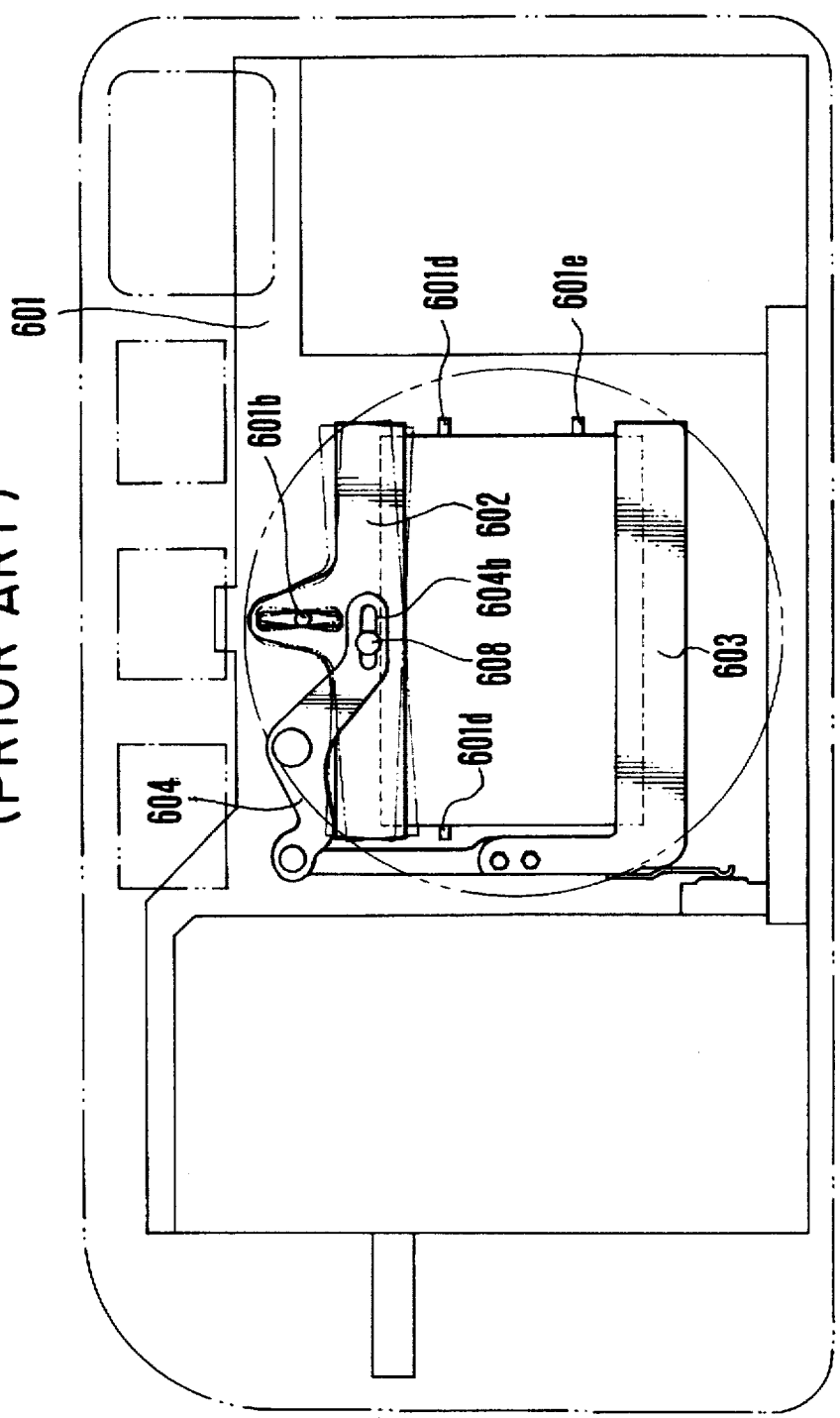
FIG. 33 is a diagrammatic, front elevational view of the arrangement of the essential portions of the camera of FIG. 31, showing a state in which the panorama blades are being retracted from the state of FIG. 31 to the outside of the photographic-lens optical path.
Figure 34:
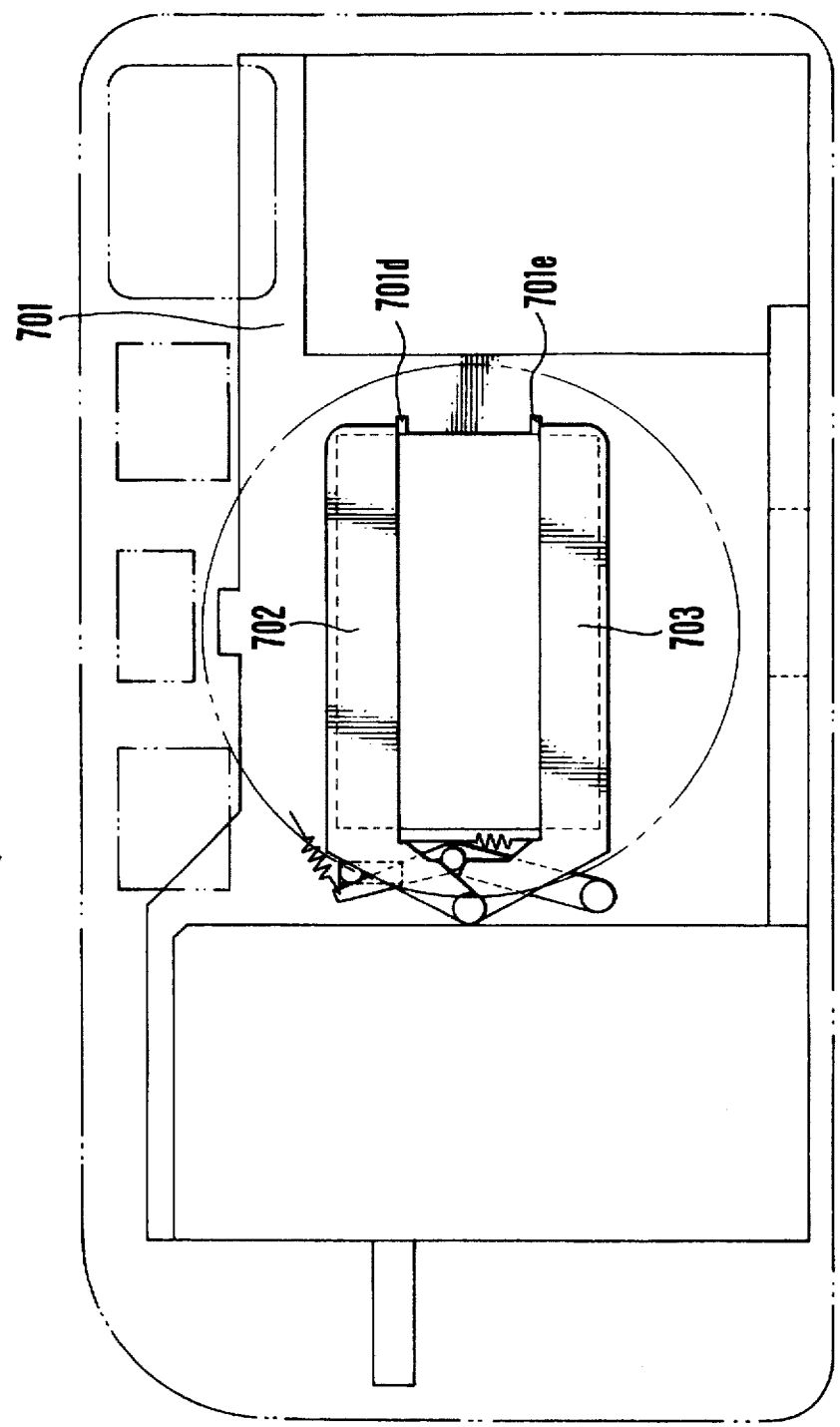
FIG. 34 is a diagrammatic, front elevational view of the arrangement of the essential portions of a camera which is proposed as a third example in Japanese Patent Application No. Hei 4-3186, showing the panorama photography state in which panorama blades have entered the photographic-lens optical path to block light in the upper and lower portions of an image plane.
Figure 35:
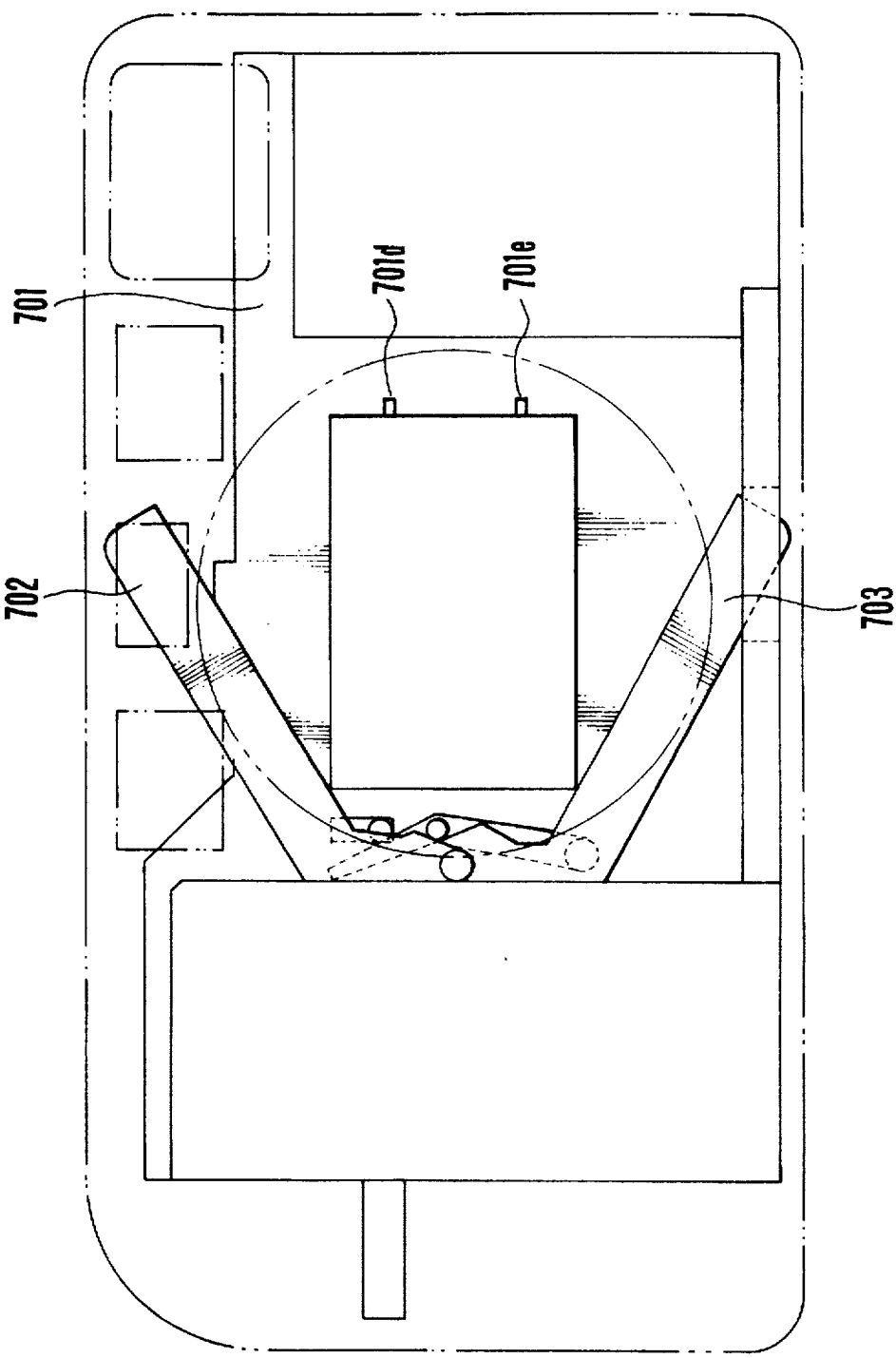
FIG. 35 is a diagrammatic, front elevational view of the arrangement of the essential portions of the camera of FIG. 31, showing the standard photography state in which the panorama blades are retracted from the photographic-lens optical path.

The shown example also includes panorama blades 402 and 403 each of which is formed of a thin plate having a light block function like a shutter blade similarly to the first embodiment and is movable back and forth along a facing wall of the camera body 401 in directions perpendicular to the optical axis of a photographic lens. Each of the panorama blades 402 and 403 has a construction identical to that explained in connection with the second example (FIGS. 31 to 33) in the above-cited Japanese Laid-open Patent Application No. Hei 4-3186. More specifically, the panorama blade 402 has a guide slot 402a with which the panorama blade guide pin 401b is engaged, so that the panorama blade 402 can move in parallel relation to the panorama blade 403 in the directions perpendicular to the optical axis of the photographic lens. A shaft 406 having a thin flange is fixed to the panorama blade 402, whereby the turning force of a panorama blade driving lever 404 can be transmitted to the panorama blade 402 through the shaft 406. The panorama blade 403 has a simple construction so that it can move back and forth without using a link mechanism, and also has an L-like shape in front elevation the proximal portion of which is integrally fixed to a standard/panorama switching knob 209 by pins.

A panorama blade driving lever 404 is likewise formed of a thin plate and is held rotatably about a shaft 405. The shaft 406 is rotatably engaged with a slot 404c which is formed in the extending end portion of an arm 404a, while a shaft 407 having a thin flange is rotatably engaged with a slot 404d which is formed in the extending end portion of an arm 404b. A connecting lever 408 is made of a thin plate and is integrally fixed to the standard/panorama switching knob 409. The shaft 407 is provided at the upper end portion of the connecting lever 408, and a click spring 408a is formed at the lower end portion of the connecting lever 408. When the connecting lever 408 slides to its upper or lower position, the click spring 408a securely fixes the connecting lever 408 at that position. The connecting lever 408 has the function of transmitting the amount of sliding of the standard/panorama switching knob 409 to the panorama blade driving lever 404. A click projection 401f which acts on the click spring 408a is formed on the camera body 401.

A guide wall 410 is formed to project from the camera body 401 and to extend along a straight end face 402b of the projection of the panorama blade 402 in which the guide slot 402a is formed, with a slight gap formed between the guide wall 410 and the straight end face 402b. The guide wall 410 guides the upward and downward rectilinear movements of the panorama blade 402 while being maintained in approximate contact with the straight end face 402b.

Guide walls 411 and 412 are formed to project from the camera body 401 and to extend, respectively, along straight end faces 402c and 402d of the panorama blade 402 with slight gaps being formed between the guide wall 411 and the straight end face 402c and between the guide wall 412 and the straight end face 402d. The guide walls 411 and 412 guide the upward and downward rectilinear movements of the panorama blade 402 while being maintained in approximate contact with the straight end faces 402c and 402d.

Although the vertical sectional view of the central portion of the camera according to the fifth embodiment is omitted, the relationship between the standard/panorama image plane switching mechanism and a zooming lens and other associated parts which constitute part of the photographic lens is substantially identical to that explained in connection with the first embodiment.

In the above-described arrangement, if panorama photography is to be performed, a back lid is opened, and the standard/panorama switching knob 409 is manually slid upward before a film is loaded. Thus, the panorama blade 403 and the connecting lever 408 which are fixed to the standard/panorama switching knob 409 integrally slide along a facing wall of the camera body 401.

Then, light is blocked in part of the lower portion of the standard photographic image plane frame by the panorama blade 403. In the meantime, the panorama blade driving lever 404 which is connected to the connecting lever 408 by the shaft 407 turns clockwise about the shaft 405, and the panorama blade 402 connected to the shaft 406 moves downward in parallel relation to the panorama blade 403 (rectilinearly) along a facing wall of the camera body 401. Thus, light is blocked in part of the upper portion of the standard photographic image plane frame by the panorama blade 402. In the above-described operation, the panorama blade 402 is guided by the three guide walls 410, 411 and 412 during and after the rectilinear movement so that the panorama blade 402 can consistently maintain a stable attitude.

Thus, the panorama blades 402 and 403 stop at the positions where their respective end faces are maintained in contact with the panorama blade stoppers 401d and 401e as shown in FIG. 23, thereby blocking light in the upper and lower portions of the standard photographic image plane frame to form the panorama image plane frame.

If the panorama photography is to be cancelled to conduct photography corresponding to the standard photography state, the standard/panorama switching knob 409 is manually slid downward before a film is loaded, whereby the state shown in FIG. 22 is reached. In this case as well, since the panorama blade 402 is guided by the three guide walls 410, 411 and 412 during and after the rectilinear movement, the panorama blade 402 can consistently maintain a stable attitude. Accordingly, the panorama blade 402 is held without positional fluctuations even during the standard photography state, whereby it is possible to prevent a part of the panorama blade 402 from blocking an edge portion of the optical path of the photographic lens.

According to the above-described first and fourth embodiments, there is provided an improved camera of the type which includes panorama blades which are disposed in the vicinity of a photographic image plane frame formed in a camera body and which form a panorama image plane frame by retractably moving toward each other in directions perpendicular to the optical axis of a photographic optical system and blocking light in part of the photographic image plane frame. In the improved camera, a panorama blade guide lever is linked to the panorama blades for causing the panorama blades to move by means of a rotatable engagement portion having no slot such as the slot used in the example proposed in the above-cited Japanese Patent Application No. Hei 4-3186 and, to guide the movements of the panorama blades, a guide pin is engaged with a rotation limiting guide hole having a shape corresponding to the movement locus of the panorama blades. Accordingly, it is possible to prevent the panorama blades from undergoing positional fluctuations when they are held in the standard photography state or during movement for frame switching, by means of a simple arrangement and without increasing the size of the camera (while keeping the size of the camera small). Furthermore, it is possible to prevent the operational reliability or quality of the camera from being remarkably degraded by the positional fluctuations during the movement, whereby the durability of the camera can be improved.

According to the fifth embodiment, there are provided a plurality of guide members which are brought into contact with part of a panorama blade to guide the movement of the panorama blade. Accordingly, similarly to the above-described embodiments, it is possible to prevent the panorama blades from undergoing positional fluctuations when they are held in the standard photography state or during movement for frame switching, by means of a simple arrangement and without increasing the size of the camera (while keeping the size of the camera small). Furthermore, it is possible to prevent operational reliability or quality from being remarkably degraded by the positional fluctuations during the movement, whereby the durability of the mechanism can be improved.

[Sixth Embodiment]

Figure 24:
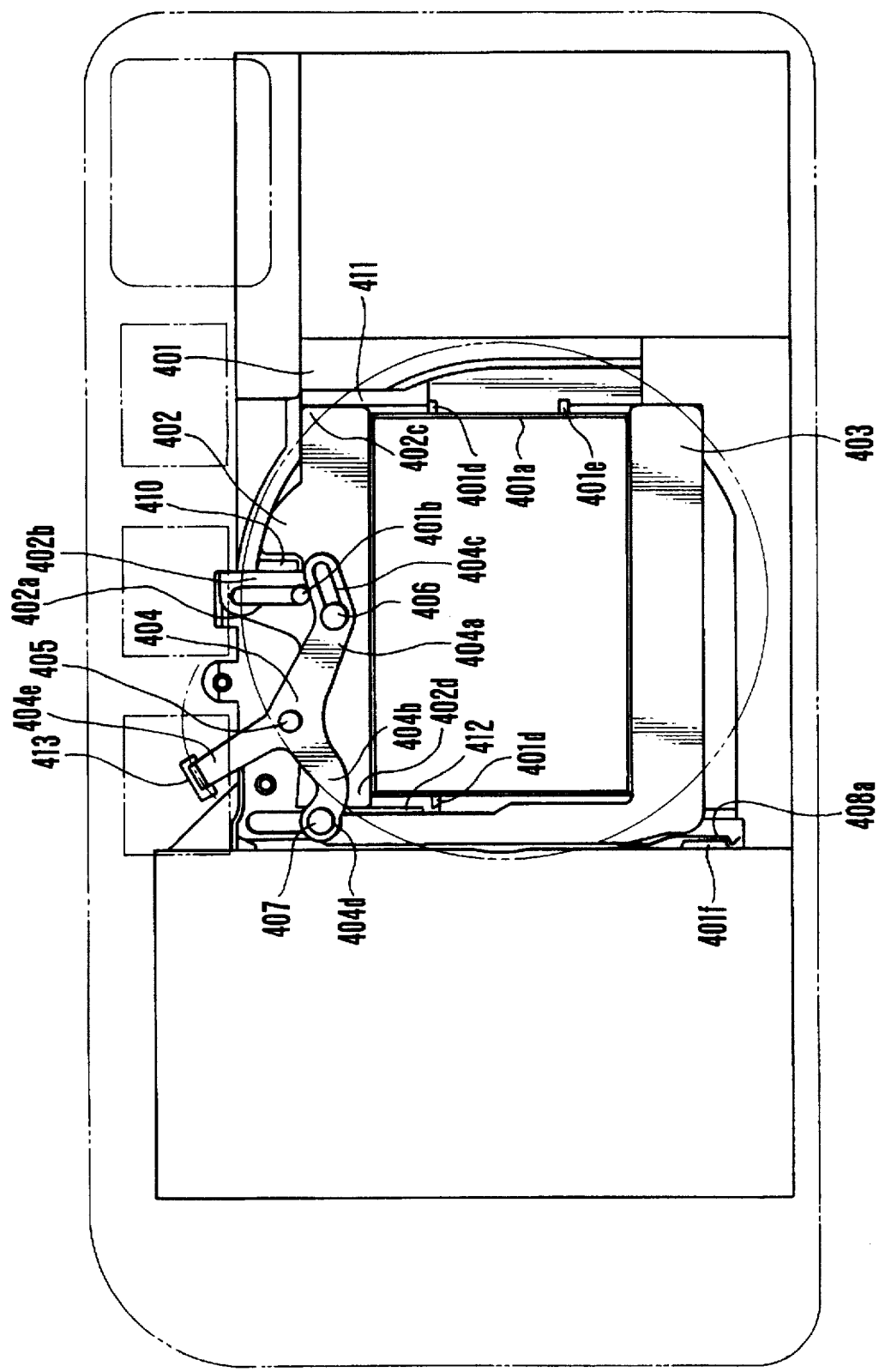
FIG. 24 is a diagrammatic, front elevational view of the arrangement of the essential portions of a camera according to a sixth embodiment of the present invention, showing the state in which panorama blades are retracted from a photographic-lens optical path.
Figure 25:
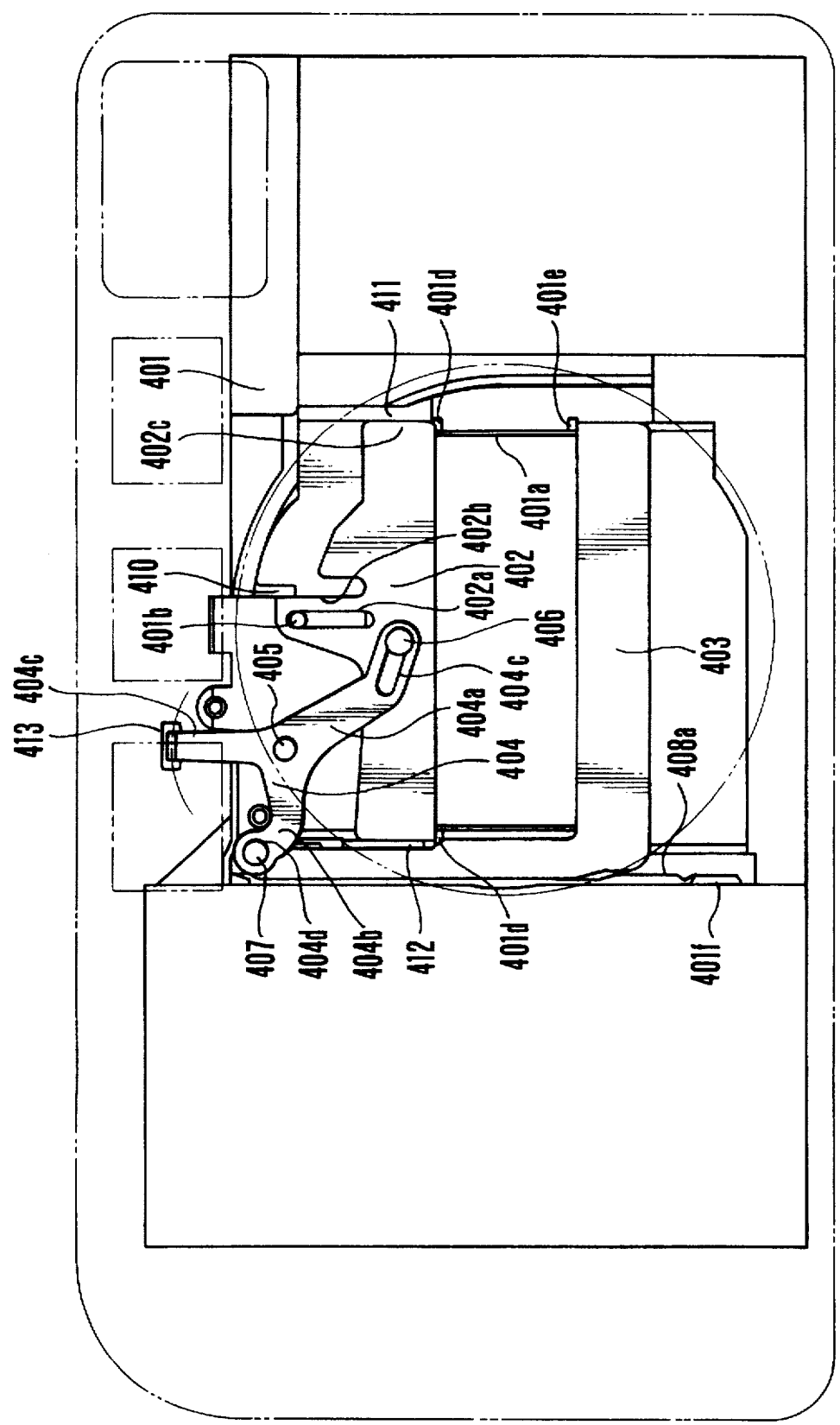
FIG. 25 is a diagrammatic, front elevational view of the arrangement of the essential portions of the camera according to the sixth embodiment of the present invention, showing the panorama photography state in which the panorama blades have entered the photographic-lens optical path to block light in the upper and lower portions of an image plane.
Figure 26:
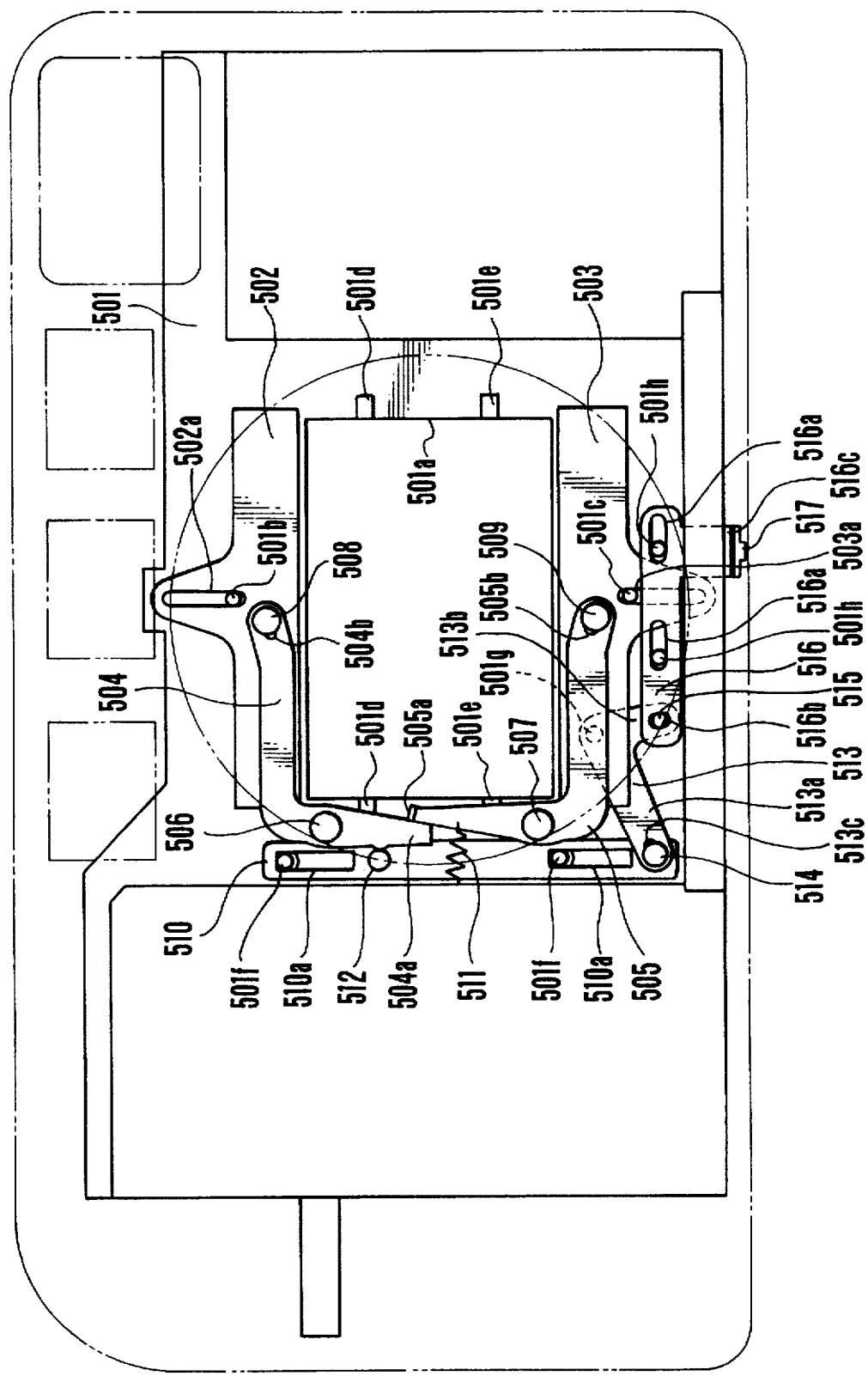
FIG. 26 is a diagrammatic, front elevational view of the arrangement of the essential portions of a camera which is proposed as a first example in Japanese Patent Application No. Hei 4-3186, showing the panorama photography state in which panorama blades have entered the photographic-lens optical path to block light in the upper and lower portions of an image plane.
Figure 27:
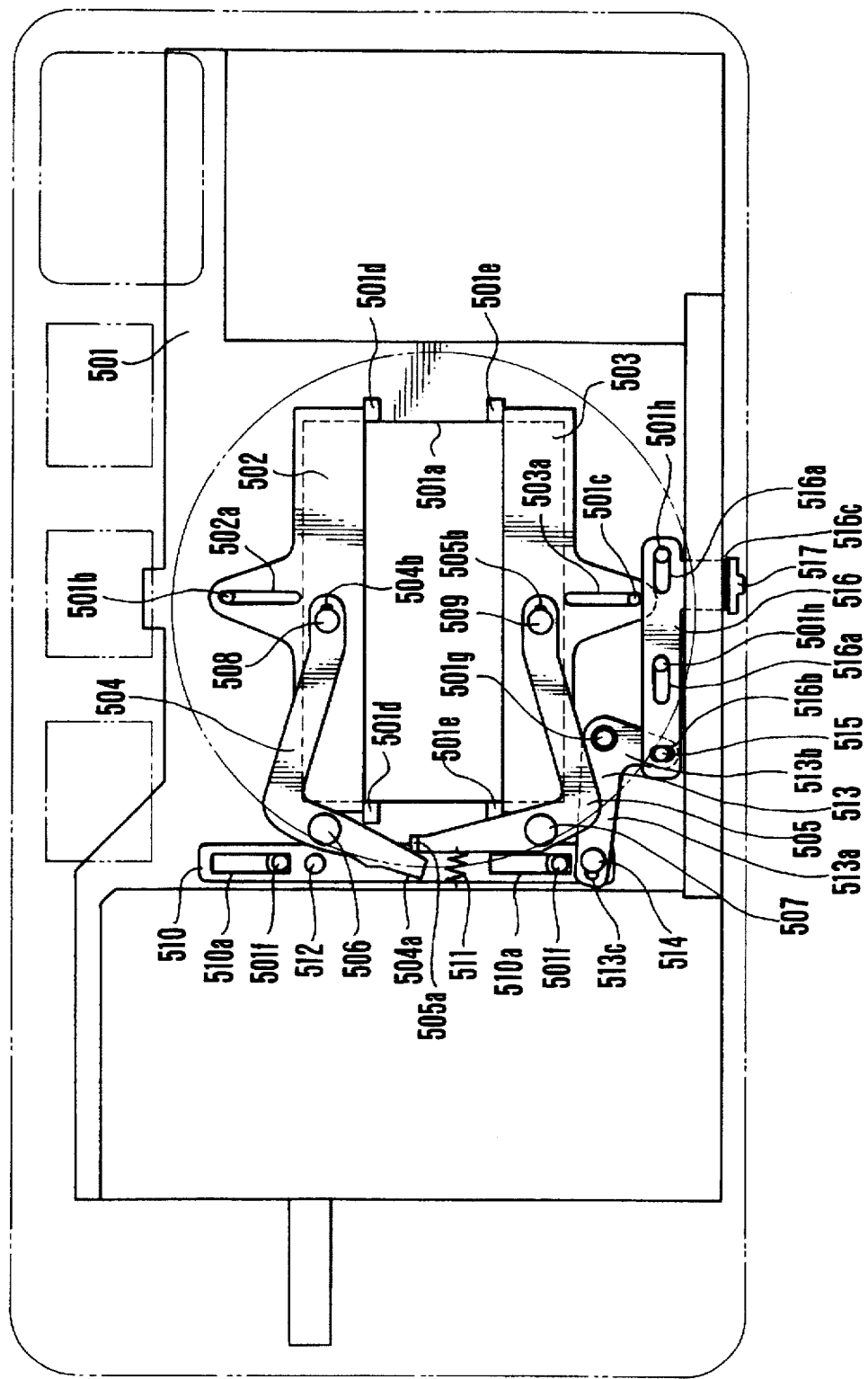
FIG. 27 is a diagrammatic, front elevational view of the arrangement of the essential portions of the camera of FIG. 26, showing the state in which the panorama blades are retracted from the photographic-lens optical path.
Figure 28:
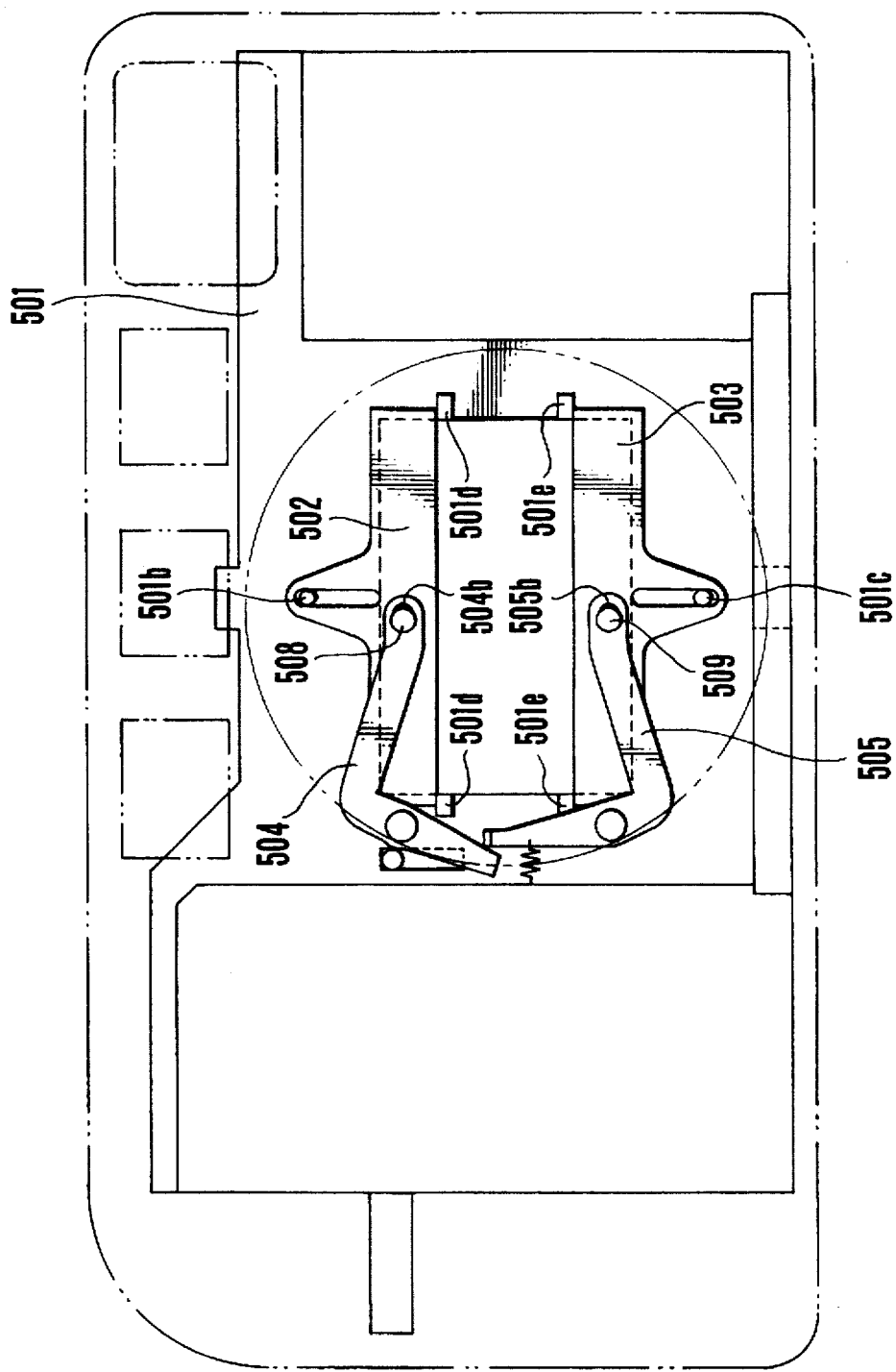
FIG. 28 is a schematic view showing portions directly related to the movement of the panorama blades during the state shown in FIG. 26.
Figure 29:
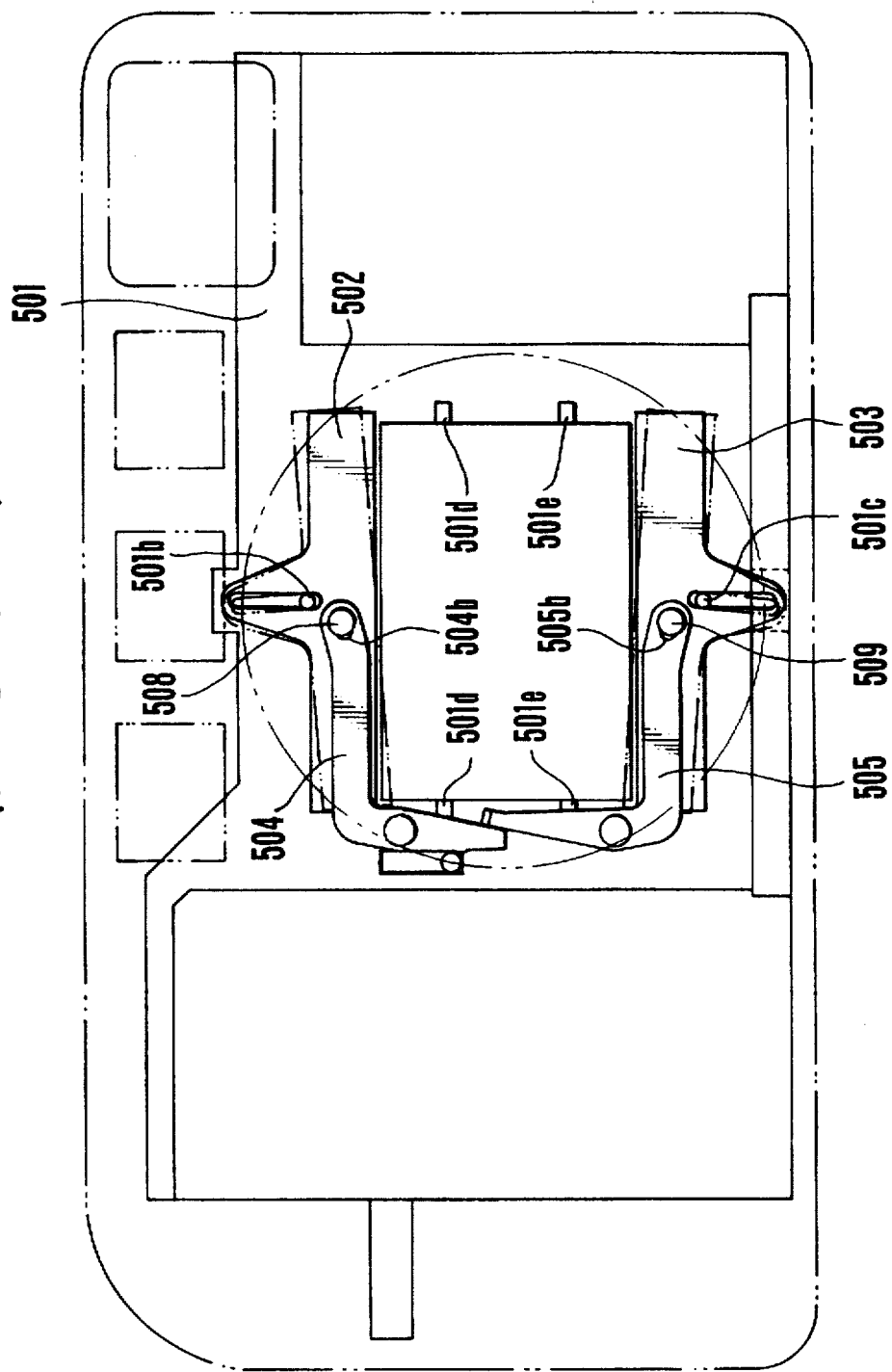
FIG. 29 is a schematic view showing the portions directly related to the movement of the panorama blades during the state shown in FIG. 27.
Figure 30:
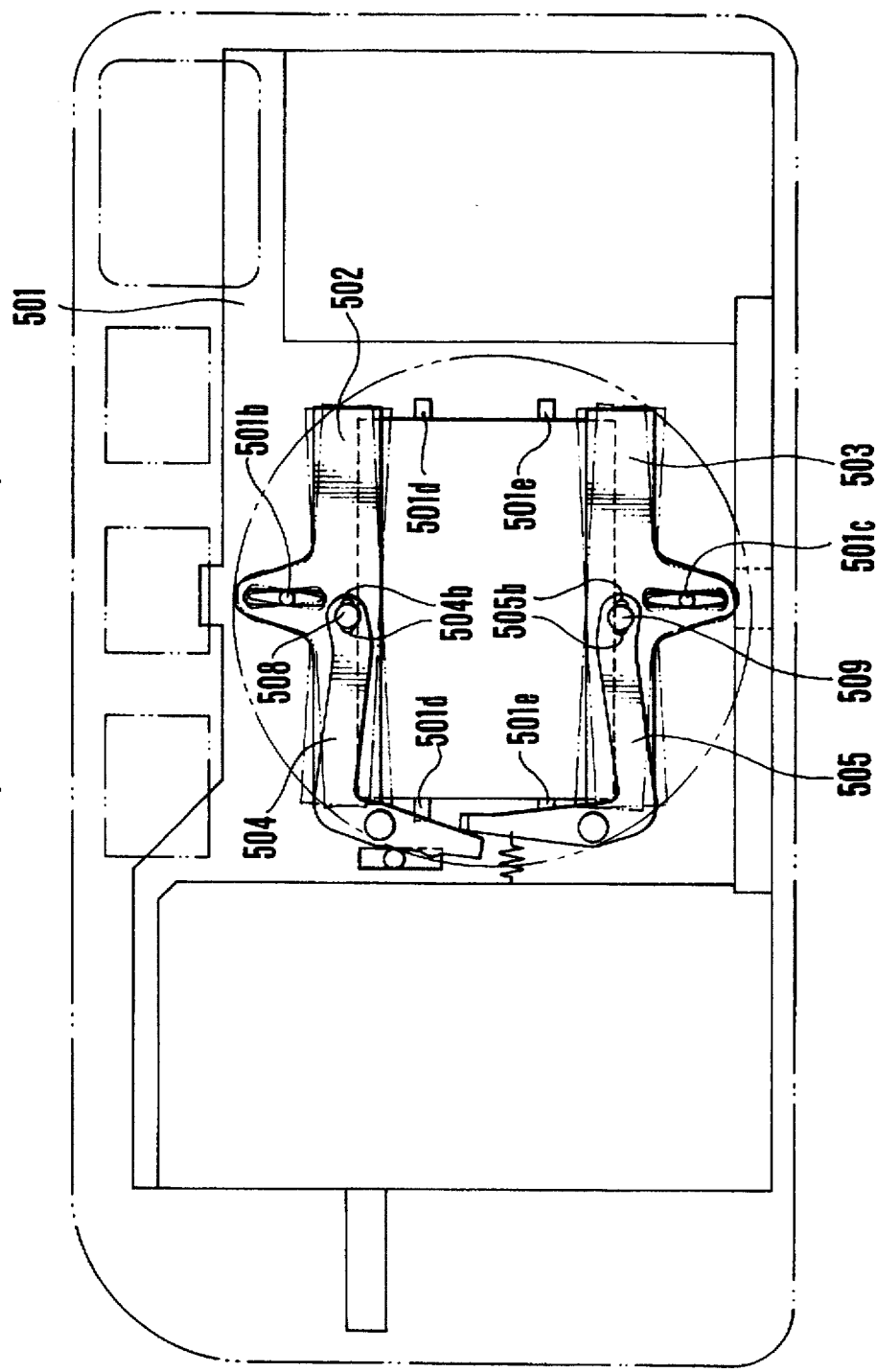
FIG. 30 is a diagrammatic, front elevational view of the arrangement of the essential portions of the camera of FIG. 26, showing a state in which the panorama blades are being retracted from the state of FIG. 28 to the outside of the photographic-lens optical path.

FIGS. 24 and 25 show a sixth embodiment of the present invention. FIG. 24 is a diagrammatic, front elevational view of the arrangement of the essential portions of a camera, and shows the state (standard photography state) in which panorama blades are retracted from a photographic-lens optical path. FIG. 25 is a diagrammatic, front elevational view of the arrangement of the essential portions of the camera, and shows the state (panorama photography state) in which the panorama blades have entered the photographic-lens optical path to block light in the upper and lower portions of an image plane.

The arrangement of the sixth embodiment is substantially identical to that of the fifth embodiment described above, and in FIGS. 24 and 25 identical reference numerals are used to denote constituent elements which are identical to those shown in FIGS. 22 and 23.

The sixth embodiment differs from the fifth embodiment with regard to only a manual operating part for standard/panorama switching, and the following description refers to only the manual operating part. The panorama blade driving lever 404 has an arm 404e in addition to the arms 404a and 404b. The arm 404e is bent toward the back side of the camera in an upper portion of the camera body 401, and a standard/panorama switching knob 413 is fixed to the extending end of the bent portion of the arm 40e. The other elements are substantially identical to those used in the fifth embodiment.

In each of the first to sixth embodiments, the panorama image plane frame is formed by two panorama blades, but the number of panorama blades is not limited to two. For example, the panorama image plane frame may be formed by a single panorama blade.

In the above description of each of the first to sixth embodiments, reference has been made to the camera which is switchable between the panorama photographic image plane frame and the standard photographic image plane frame. However, the present invention is also applicable to an optical apparatus such as a camera which has other kinds of switchable image plane frames.

As described above, according to each of the embodiment of the present invention, light blocking means is held by a shaft whose relative position is invariable, and a lever member is provided for causing the light blocking means to retractably move in directions perpendicular to the optical axis of a photographic optical system. There are also provided a guide cam groove having a shape corresponding to the movement locus of the light blocking means and a guide pin engaged with the guide cam, and the light blocking means is provided with either one of the guide cam groove and the guide pin, while a fixed member is provided with the other. The movement of the light blocking means is guided by the guide cam groove having the shape corresponding to the movement locus of the light blocking means and the guide pin engaged with the guide cam groove.

There is provided another arrangement which includes a lever member for holding the light blocking means to cause the light blocking means to retractably move in the directions perpendicular to the optical axis of the photographic optical system, and a plurality of guide members provided for guiding one of the light blocking means in the direction of retractable movement thereof. The movement of the light blocking means is guided by the plurality of guide members.

Accordingly, it is possible to prevent the light blocking means from undergoing positional fluctuations when they are held in the standard photography state or during movement for frame switching, by means of a simple arrangement and without increasing the size of the camera. Furthermore, it is possible to prevent the operational reliability or quality of the camera from being degraded by the positional fluctuations during the movement, whereby the durability of the mechanism can be improved.

Furthermore, according to each of the embodiments, there is a camera having switchable photographic image plane frames in which at least two light blocking means, which are supported in such a manner as to be able to retractably enter the optical path of the photographic optical system, are made to enter the optical path to block part of a photographic light flux, thereby switching the photographic image plane frames. In the camera, there is provided a lever member for causing the at least two light blocking members to move, and at least two operating parts for directly driving the at least two light blocking members are provided on the lever member. Accordingly, it is possible to provide a photographic image plane frame switching mechanism which has a simple construction and a reduced number of constituent parts and is convenient for miniaturization of cameras. Further, it is possible to reduce the number of connecting portions of the photographic image plane frame switching mechanism, thereby improving the operational efficiency, operational reliability and durability of the camera.

Furthermore, as a matter of course, assembly efficiency is improved, and the number of manufacturing steps can be reduced and a fraction defective is decreased. Accordingly, part costs and manufacturing costs can be decreased to provide great economical merits.

What is claimed is:

1. A camera capable of switching over an image plane size, comprising:

image plane size switching over member, which, by changing a light shielding condition by movement, switches the image plane size between a first image plane size and a second image plane size smaller than the first image plane size, an urging portion which urges the image plane size switching over member, said urging portion exerting the urging action in such a manner that the urging direction is changed over when the image plane size switching over member is at a predetermined position in a movement process for the switching over, and a judgment device which judges if the image plane size switching over member is at the first or second plane size, said judgment device judging the image plane size switching over member is set at the second plane size when the member is at the predetermined position.

2. A camera according to claim 1, wherein the image plane size switching over member includes light-shielding means for shielding at least part of a photographic optical path and means for changing the light shielding of the light shielding means.

3. A camera according the claim 2, wherein said light shielding means includes a movement member which is movable back and forth in the photographic optical path.

4. A camera according to claim 3, wherein said urging portion urges the movement member, said urging portion changing the urging direction when the movement member is at a predetermined position between a first position for forming the first image plane size and a second position for forming the second image plane size, said judgement device including means for judging that the image plane size is the second image plane size when the movement member is at the predetermined position.

5. A camera according to claim 4, wherein the urging portion urges the movement member toward the first position when the movement member is between the first position and the predetermined position, and urges the movement member toward the second position when the movement member is between the second position and the predetermined position.

6. A camera according to claim 2, wherein the image plane size switching over member includes means for keeping the light shielding means in a non-shielding state when the first image plane size is formed and keeping the light shielding means in a shielding state when the second image plane size is formed.

7. A camera according to claim 1, wherein the judgement device includes switching means which switches during the switching over process of the image plane size between when the image plane size forms the first image plane size and when the switching over means stops.

8. A camera according to claim 1, further comprising display means for displaying whether the image plane size is the first image plane size or the second image plane size on the basis of the judgement of the judgement device.

9. A camera according to claim 1, wherein the first image plane size is an ordinary image plane size, and the second image plane size is a panorama image plane size shorter in the longitudinal length than the first image plane size.

10. A camera having a variable-sized image plane, comprising:
image plane size switching over means movable between a first position for forming a first image plane size and a second position for forming a second image plane size smaller than the first image plane size;
urging means for urging the image plane size switching over means in a first direction when said switching over means is in said first position and for urging the switching over means in a second direction different from said first direction when said switching over means is in said second position, said switching over means being movable to an intermediate position that is between said first and second positions and at which the urging means does not urge the switching over means in either one of said first and second directions; and
indicator means for indicating that the second image plane size is formed when the switching over means is at the intermediate position.

11. A camera according to claim 10, wherein the image plane size switching over means includes a light shielding member movable in a photographic optical path for changing a light shielding condition of the light shielding member.

12. A camera according to claim 10, wherein the urging means urges the image plane size switching over means toward the first position when the switching over means is between the first position and the intermediate position and urges the switching over means toward the second position when the switching over means is between the second position and the intermediate position.

13. A camera according to claim 10, wherein the indicator means includes an electrical switch that is changed from a first state to a second state by the image plane size switching over means while the switching over means moves from the first position to the intermediate position.

14. A camera according to claim 10, wherein the first image plane size is a standard image plane size, and the second image plane size is a panorama image plane size shorter in the longitudinal length than the standard image plane size.

15. An optical apparatus capable of switching over an image plane size, comprising:
image plane size switching over member, which, by changing a light shielding condition by movement, switches the image plane size between a first image plane size and a second image plane size smaller than the first image plane size,
an urging portion which urges the image plane size switching over member, said urging portion exerting the urging action in such a manner that the urging direction is changed over when the image plane size switching over member is at a predetermined position in a movement process for the switching over, and
a judgment device which judges if the image plane size switching over member is at the first or second plane size, said judgment device judging the image plane size switching over member is set at the second plane size when the member is at the predetermined position.

16. An image plane changing apparatus capable of switching over an image plane size, comprising:
image plane size switching over member, which, by changing a light shielding condition by movement, switches
the image plane size between a first image plane size and a second image plane size smaller than the first image plane size,
an urging portion which urges the image plane size switching over member, said urging portion exerting the urging action in such a manner that the urging direction is changed over when the image plane size switching over member is at a predetermined position in a movement process for the switching over, and
a judgment device which judges if the image plane size switching over member is at the first or second plane size, said judgment device judging the image plane size switching over member is set at the second plane size when the member is at the predetermined position.

17. An optical apparatus having a variable-sized image plane, comprising:
image plane size switching over means movable between a first position for forming a first image plane size and a second position for forming a second image plane size smaller than the first image plane size;
urging means for urging the image plane size switching over means in a first direction when said switching over means is in said first position and for urging the switching over means in a second direction different from said first direction when said switching over means is in said second position, said switching over means being movable to an intermediate position that is between said first and second positions and at which the urging means does not urge the switching over means in either one of said first and second directions; and indicator means for indicating that the second image plane size is formed when the switching over means is at the intermediate position.

18. An image plane changing apparatus having a variable-sized image plane, comprising:

image plane size switching over means movable between a first position for forming a first image plane size and a second position for forming a second image plane size smaller than the first image plane size;

urging means for urging the image plane size switching over means in a first direction when said switching over means is in said first position and for urging the switching over means in a second direction different from said first direction when said switching over means is in said second position, said switching over means being movable to an intermediate position that is between said first and second positions and at which the urging means does not urge the switching over means in either one of said first and second directions; and indicator means for indicating that the second image plane size is formed when the switching over means is at the intermediate position.

19. A camera capable of switching over an image plane size, comprising:

image plane size switching over member, which by changing a light shielding condition by movement, switches the image plane size between a first image plane size and a second image plane size smaller than the first image plane size, an urging portion which urges the image plane size switching over member, said urging portion exerting the urging action in such a manner that the urging action is changed over when the image plane size switching over member is at a predetermined position in a movement process for the switching over, and an indicator which indicates if the image plane size switching over member is at the first or second plane size, said indicator indicating that the image plane size switching over member is set at the second image plane size when the member is at the predetermined position.

20. An optical apparatus capable of switching over an image plane size, comprising:

image plane size switching over member, which, by changing a light shielding condition by movement, switches the image plane size between a first image plane size and a second image plane size smaller than the first image plane size, an urging portion which urges the image plane size switching over member, said urging portion exerting the urging action in such a manner that the urging action is changed over when the image plane size switching over member is at a predetermined position in a movement process for the switching over, and an indicator which indicates if the image plane size switching over member is at the first or second plane size, said indicator indicating that the image plane size switching over member is set at the second image plane size when the member is at the predetermined position.

21. An image plane changing apparatus capable of switching over an image plane size, comprising:

image plane size switching over member, which, by changing a light shielding condition by movement, switches the image plane size between a first image plane size and a second image plane size smaller than the first image plane size, an urging portion which urges the image plane size switching over member, said urging portion exerting the urging action in such a manner that the urging action is changed over when the image plane size switching over member is at a predetermined position in a movement process for the switching over, and an indicator which indicates if the image plane size switching over member is at the first or second plane size, said indicator indicating that the image plane size switching over member is set at the second image plane size when the member is at the predetermined position.

22. A camera having a variable-sized image plane, comprising:

image plane size switching over means movable between a first position for forming a first image plane size and a second position for forming a second image plane size smaller than the first image plane size;

urging means for urging the image plane size switching over means in a first direction when said switching over means is in said first position and for urging the switching over means in a second direction different from said first direction when said switching over means is in said second position, said switching over means being movable to an intermediate position that is between said first and second positions and at which the urging means does not urge the switching over means in either one of said first and second directions; and judgment means for judging a set condition of the image plane, said judgment means judging that the second image plane is set when said switching over means is at the intermediate position.

23. An optical apparatus having a variable-sized image plane, comprising:

image plane size switching over means movable between a first position for forming a first image plane size and a second position for forming a second image plane size smaller than the first image plane size;

urging means for urging the image plane size switching over means in a first direction when said switching over means is in said first position and for urging the switching over means in a second direction different from said first direction when said switching over means is in said second position, said switching over means being movable to an intermediate position that is between said first and second positions and at which the urging means does not urge the switching over means in either one of said first and second directions; and judgment means for judging a set condition of the image plane, said judgment means judging that the second image plane is set when the switching over means is at the intermediate position.

24. An image plane changing apparatus having a variable-sized image plane, comprising:

image plane size switching over means movable between a first position for forming a first image plane size and a second position for forming a second image plane size smaller than the first image plane size;

urging means for urging the image plane size switching over means in a first direction when said switching over means is in said first position and for urging the switching over means in a second direction different from said first direction when said switching over means is in said second position, said switching over means being movable to an intermediate position that is between said first and second positions and at which the urging means does not urge the switching over means in either one of said first and second directions; and judgment means for judging a set condition of the image plane, said judgment means judging that the second image plane is set when the switching over means is at the intermediate position.

* * * * *

UNITED STATES PATENT AND TRADEMARK OFFICE
CERTIFICATE OF CORRECTION

PATENT NO. : 5,732,301
DATED : March 24, 1998
INVENTOR(S) : Yasuhiro Toyoda, et al.

It is certified that error appears in the above-identified patent and that said Letters Patent is hereby corrected as shown below:

Col. 12, line 40, delete "pin" and insert -- pins --.

Col. 13, line 34, delete "if" and insert -- 1f --.

Col. 23, line 50, delete "40e" and insert -- 404e --.

Signed and Sealed this

First Day of December, 1998

Attest:

BRUCE LEHMAN

*Attesting Officer*     *Commissioner of Patents and Trademarks*